INVENTOR.
ARTHUR R. TOBEY
BY Lyon & Lyon
ATTORNEYS

FOR 1 FRAME DELAY $A = r(1-r)^{-1}$
FOR N FRAME DELAY $A = r^N(1-r^N)^{-1}$

INVENTOR.
ARTHUR R. TOBEY
BY Lyon & Lyon
ATTORNEYS

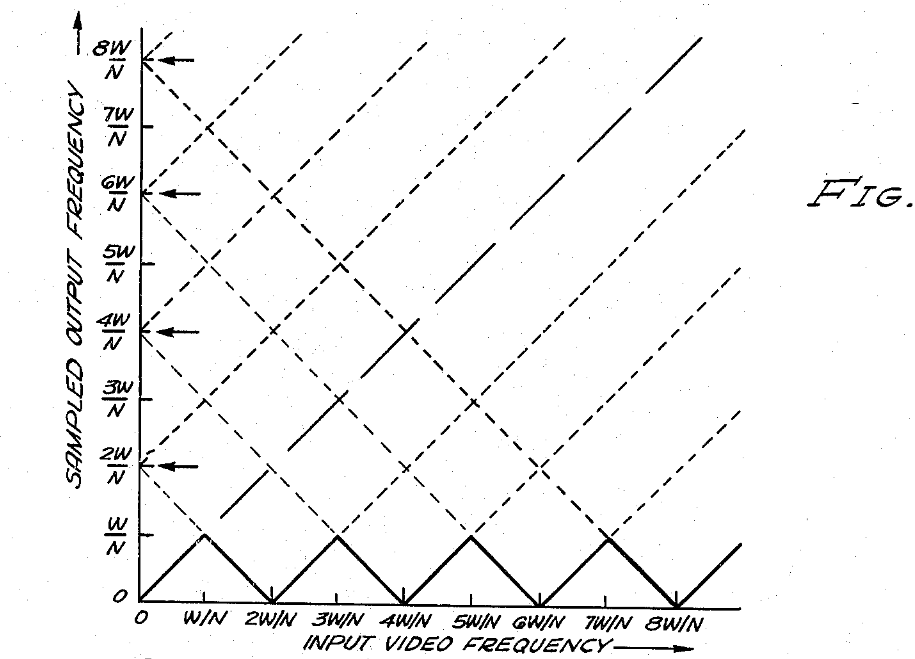

FIG. 6.

← ARROWS DESIGNATE FREQUENCIES OF SAMPLING PULSE TRAIN FOURIER COMPONENTS
— — — LONG DASHES INDICATE UNMODIFIED VIDEO COMPONENTS
- - - - - SHORT DASHES INDICATE SIDEBAND COMPONENTS GENERATED IN SAMPLING PROCESS
——— SOLID LINE DESIGNATES COMPONENTS RETAINED AFTER LOW-PASS FILTERING

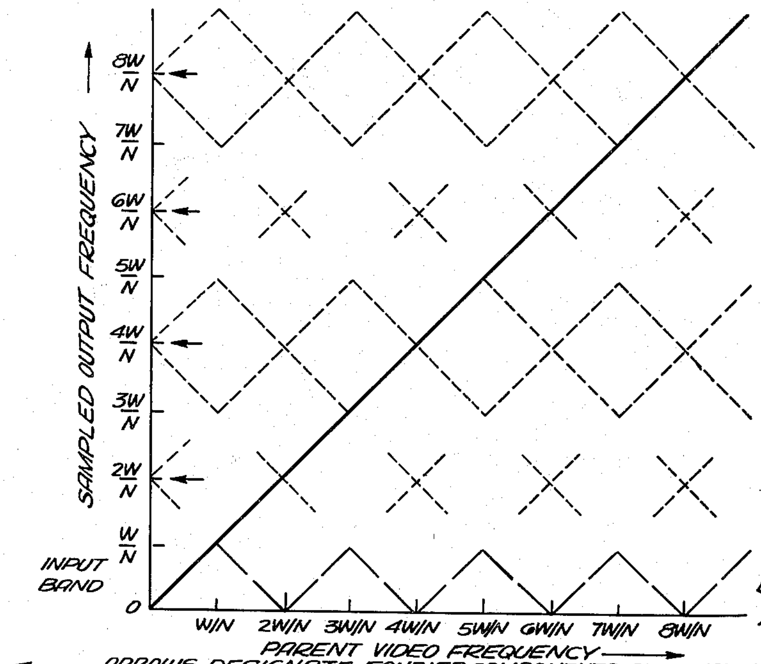

FIG. 7.

← ARROWS DESIGNATE FOURIER COMPONENTS OF SAMPLING PULSE
— — — LONG DASHES INDICATE INPUT COMPONENTS
- - - - - SHORT DASHES INDICATE SIDEBAND COMPONENTS GENERATED IN SAMPLING PROCESS (COMPLETELY DRAWN ONLY FOR EVEN HARMONICS)
——— SOLID LINE DESIGNATES PROPERLY RECONSTRUCTED COMPONENTS OF PARENT VIDEO SIGNAL

INVENTOR
ARTHUR R. TOBEY
BY Lyon & Lyon
ATTORNEYS

| RECONSTRUCTED VIDEO FREQUENCY ↑ / PARENT VIDEO FREQUENCY → | 0 – W/N | W/N – 2W/N | 2W/N – 3W/N | 3W/N – 4W/N | 4W/N – 5W/N | 5W/N – 6W/N | 6W/N – 7W/N | 7W/N – 8W/N | 8W/N – 9W/N |
|---|---|---|---|---|---|---|---|---|---|
| 9W/N – 8W/N | $\phi_{4K}$ | $\phi_{4K}+\phi_{1K}$ | $\phi_{4K}-\phi_{1K}$ | $\phi_{4K}+\phi_{2K}$ | $\phi_{4K}-\phi_{2K}$ | $\phi_{4K}+\phi_{3K}$ | $\phi_{4K}-\phi_{3K}$ | $2\phi_{4K}$ | 0 |
| 8W/N – 7W/N | $\phi_{4K}$ | $\phi_{4K}-\phi_{1K}$ | $\phi_{4K}+\phi_{1K}$ | $\phi_{4K}-\phi_{2K}$ | $\phi_{4K}+\phi_{2K}$ | $\phi_{4K}-\phi_{3K}$ | $\phi_{4K}+\phi_{3K}$ | 0 | $2\phi_{4K}$ |
| 7W/N – 6W/N | $\phi_{3K}$ | $\phi_{3K}+\phi_{1K}$ | $\phi_{3K}-\phi_{1K}$ | $\phi_{3K}+\phi_{2K}$ | $\phi_{3K}-\phi_{2K}$ | $2\phi_{3K}$ | 0 | $\phi_{3K}+\phi_{4K}$ | $\phi_{3K}-\phi_{4K}$ |
| 6W/N – 5W/N | $\phi_{3K}$ | $\phi_{3K}-\phi_{1K}$ | $\phi_{3K}+\phi_{1K}$ | $\phi_{3K}-\phi_{2K}$ | $\phi_{3K}+\phi_{2K}$ | 0 | $2\phi_{3K}$ | $\phi_{3K}-\phi_{4K}$ | $\phi_{3K}+\phi_{4K}$ |
| 5W/N – 4W/N | $\phi_{2K}$ | $\phi_{2K}+\phi_{1K}$ | $\phi_{2K}-\phi_{1K}$ | $2\phi_{2K}$ | 0 | $\phi_{2K}+\phi_{3K}$ | $\phi_{2K}-\phi_{3K}$ | $\phi_{2K}+\phi_{4K}$ | $\phi_{2K}-\phi_{4K}$ |
| 4W/N – 3W/N | $\phi_{2K}$ | $\phi_{2K}-\phi_{1K}$ | $\phi_{2K}+\phi_{1K}$ | 0 | $2\phi_{2K}$ | $\phi_{2K}-\phi_{3K}$ | $\phi_{2K}+\phi_{3K}$ | $\phi_{2K}-\phi_{4K}$ | $\phi_{2K}+\phi_{4K}$ |
| 3W/N – 2W/N | $\phi_{1K}$ | $2\phi_{1K}$ | 0 | $\phi_{1K}+\phi_{2K}$ | $\phi_{1K}-\phi_{2K}$ | $\phi_{1K}+\phi_{3K}$ | $\phi_{1K}-\phi_{3K}$ | $\phi_{1K}+\phi_{4K}$ | $\phi_{1K}-\phi_{4K}$ |
| 2W/N – W/N | $\phi_{1K}$ | 0 | $2\phi_{1K}$ | $\phi_{1K}-\phi_{2K}$ | $\phi_{1K}+\phi_{2K}$ | $\phi_{1K}-\phi_{3K}$ | $\phi_{1K}+\phi_{3K}$ | $\phi_{1K}-\phi_{4K}$ | $\phi_{1K}+\phi_{4K}$ |
| W/N – 0 | 0 | $\phi_{1K}$ | $-\phi_{1K}$ | $\phi_{2K}$ | $-\phi_{2K}$ | $\phi_{3K}$ | $-\phi_{3K}$ | $\phi_{4K}$ | $-\phi_{4K}$ |

PARENT VIDEO FREQUENCY →

RECONSTRUCTED VIDEO FREQUENCY →

SAMPLING FREQUENCIES $w_n \sim 2nW/N$
SAMPLING COMPONENT PHASES IN Kth FRAME $\phi_{nk}$

OVER-ALL PHASE RELATIONSHIPS

FIG. 8

INVENTOR.
ARTHUR R. TOBEY
BY Lyon & Lyon
ATTORNEYS

TRANSMISSION SYSTEM

Filed June 9, 1958 6 Sheets-Sheet 5

INVENTOR.
ARTHUR R. TOBEY
BY
Lyon & Lyon
ATTORNEYS

Aug. 15, 1961 A. R. TOBEY 2,996,574

TRANSMISSION SYSTEM

Filed June 9, 1958 6 Sheets-Sheet 6

INVENTOR.
ARTHUR R. TOBEY
BY
Lyon & Lyon
ATTORNEYS 2,996,574

TRANSMISSION SYSTEM

Arthur R. Tobey, Los Altos, Calif., assignor to Technicolor Corporation, Hollywood, Calif., a corporation of Maine Filed June 9, 1958, Ser. No. 740,952
22 Claims. (Cl. 178—6)

This invention relates to transmission systems and, more particularly, to an improved system for transmitting and receiving information signals containing redundant information, such as in television signals.

Interlace techniques for reducing bandwidth in television are known and employed today. These techniques trade bandwidth for time of transmission. For example, in black and white television transmission, two fields are transmitted per frame in order to obtain a reduction in bandwidth by 2. However, an extension of this technique has not been commercially approved for the reason that the resulting picture has effects known as crawl and structural pattern, which render the picture completely nonacceptable.

An object of this invention is to provide a television system employing high-order interlace wherein structure and crawl effects are reduced to the point where a picture acceptable for commercial utilization is provided.

Yet another object of this invention is to provide a bandwidth reduction system which still makes available a commercially acceptable television picture.

A further object of this invention is to provide a novel and useful television transmission system.

These and other objects of the invention are achieved, in a television transmission and receiving system, wherein, at the transmitter, video signals are first modified in a differencing process. In this differencing process, signal components of a picture due to motion are emphasized and signal components due to the stationary portion of the picture are minimized. Thereafter, sampling techniques are employed for the purpose of reducing the bandwidth of the signals obtained by the differencing process. Although any well-known sampling techniques may be employed here, sampling, using sampling wave shapes exhibiting a minimum of structural regularity is preferred.

The resultant signals may then be transmitted through a bandwidth limited transmission link to a receiver at which an acceptable video picture is to be presented. This entails first a resampling operation, complementary to the sampling operation performed at the transmitter. The signals obtained as a result of the resampling operation are then applied to a system wherein an integrating operation is performed. The integration operation serves to reduce the visibility of the sampling effects to the point where an acceptable picture is obtained.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 6 is a graph of input video frequency vs. sampled output frequency at a transmitter, shown to assist in an understanding of this invention;

FIGURE 7 is a graph of parent video frequency vs. sampled output frequency at a receiver, shown to assist in an understanding of this invention;

FIGURE 8 is a table of phase relationships between parent video frequency and reconstructed video;

In the system to be described herein, bandwidth reduction is obtained through an increase in transmission time. Further, the system to be described herein involves the application of high-order interlace to a reduced redundancy video signal. High-order interlace implies some sort of sampling process. Video, which is reconstructed thereafter, exhibits a sampling structure which can only be eliminated from the viewed picture by performing a summing process over complete cycles of interlace. If the time used in the interlace process is comparable to or longer than the time of persistence of vision of the eye, then some additional arrangement must be employed, such as electronic integration, prior to presenting these signals to a viewing system.

In stationary areas of the picture where the eye has a chance to dwell and seek out details, this averaging must be nearly complete. In moving areas, however, where a convincing illusion of motion is more important than fidelity in detail, rapid response to changes is required. If standard video signals are sampled directly, these requirements become incompatible as the order of interlace and picture transmission time increase, since the averaging process precludes rapid response to changing information. In the present invention, this difficulty is resolved by providing the necessary electronic averaging immediately prior to the viewing device, and in an inverse process, i.e., differencing prior to initial sampling. In still areas, the differencing function is inoperative and adequate integration occurs. In areas of motion, the differencing and integration processes are complementary, thereby providing rapid response.

Figure 1:
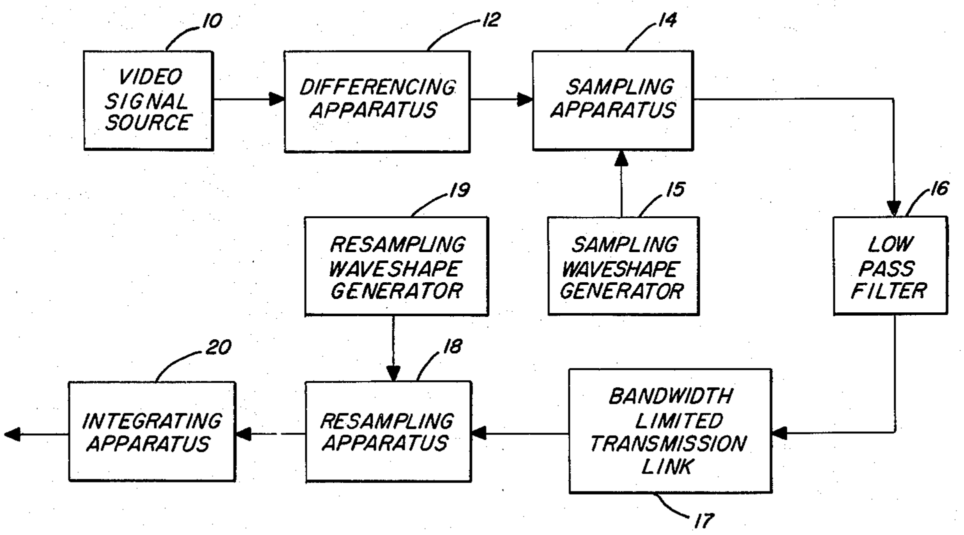
FIGURE 1 is a block diagram of the principal components of a communication system in accordance with this invention.

Attention is now directed to FIGURE 1 of the drawing, which shows a block diagram of the principal components required in a communication system in accordance with this invention. In the description that follows, the term "video signal" will be employed to refer to signals having the characteristics of television video signals, although not necessarily restricted thereto. It will be understood that the use of the television video signal characteristics herein is for the purpose of description and should not be construed as a limitation upon the utilization of the system. In FIGURE 1, a rectangle 10 represents a video signal source. This may be a television camera or any other suitable source of video signals. The output of the video signal source is applied to apparatus identified as differencing apparatus 12. The output of the differencing apparatus is applied to sampling apparatus 14, to which there are also applied sampling wave shapes from a sampling wave shape generator 15. The output of the sampling apparatus is then applied to a linear-phase low-pass filter 16. The output of the filter is transmitted through a bandwidth limited transmission link 17. Alternative to transmission, the output of the low-pass filter may be recorded for subsequent transmission or reproduction.

At a receiver, a resampling operation occurs by means of resampling apparatus 18, to which output from a resampling wave shape generator 19 is applied. The output of the resampling apparatus 18 is then applied to integrating apparatus 20. The output of the integrating apparatus 20 is applied to either a viewing device or any desired type of distribution system. This can include the usual television broadcasting system.

In the system shown in FIGURE 1, the output of the differencing apparatus 12 consists of a signal which is the sum of the unmodified video at low level and the difference signal at high level. This signal undergoes sampling, and there is obtained thereafter a sampled modified video signal. This signal is passed through a narrow-band filter, to provide a narrow-band signal. At the receiver, the narrow-band signal first goes through a resampling operation in order to re-establish the high-frequency components of the signal. The output of the resampling apparatus comprises resampled video, which can then be applied to the integrating apparatus. The purpose of the integrating operation, as previously indicated, is for eliminating spurious structure and crawl from the picture, as will be more fully developed herein.

*Integrating operation*

Figure 2:
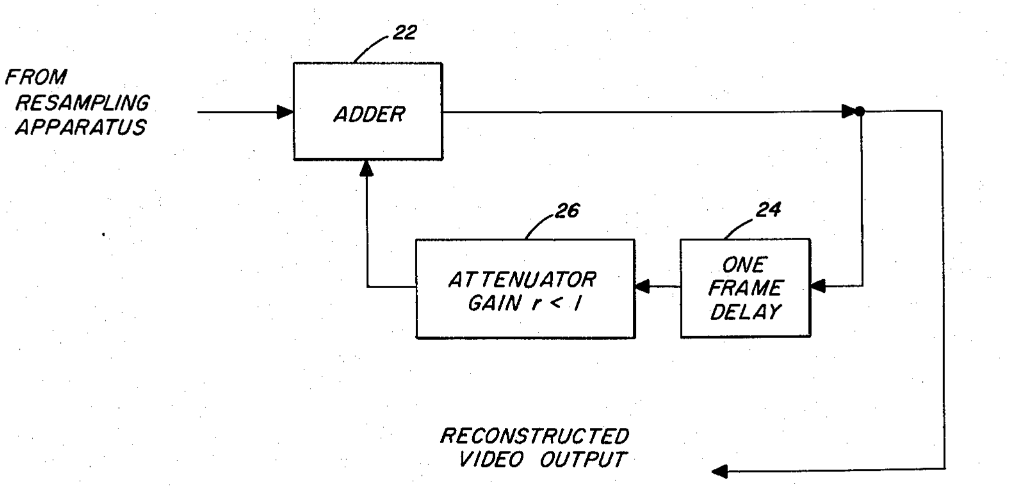
FIGURE 2 is a block diagram illustrating a suitable arrangement for an integrating operation at a receiver apparatus in accordance with this invention.

Reference is now made to FIGURE 2, which shows a block diagram of one embodiment of circuitry suitable for use as the integrating apparatus 20, shown in FIGURE 1. FIGURE 2 illustrates integration performed by recirculating techniques, best instrumented with a delay line where delay inherent in auxiliary amplifiers and compensating networks in the loop may be lumped into the required total delay. In FIGURE 2, the resampled video signal at the receiver is applied to an adder 22. This can comprise any electrical adding network well known in the art, which is used to add two signals together and provide a resultant output. The output of the adder 22 will comprise the reconstructed video output which can be presented to apparatus suitable for displaying the picture. The output of the adder 22 is also applied to a one-frame delay circuit 24, which also can comprise either passive or active delay components well known in the art serving the function of delaying the signal for one frame. The output of the one-frame delay system 24 is applied to an attenuator 26. The attenuator includes all necessary amplifiers and serves the function of establishing the gain of the loop, including the adder and one-frame delay network at some value less than one. The output of the attenuator 26 is applied to the adder 22 input.

Figure 3:
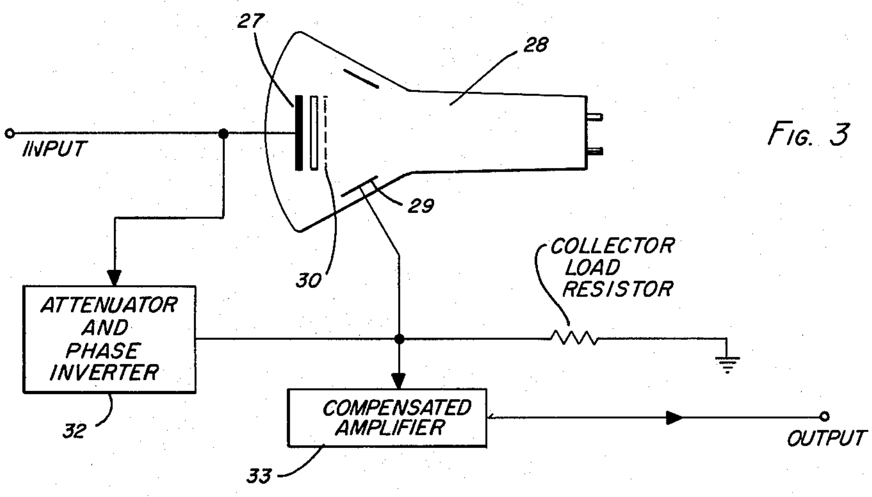
FIGURE 3 is a circuit diagram of a preferred integrating apparatus at a receiver suitable for use with this invention.

FIGURE 3 illustrates another preferred arrangement for integrating apparatus which does not require recirculating storage. In FIGURE 3 there is shown a barrier-grid storage tube 28, which is described, for example, in a book by Knoll and Kazen, entitled "Storage Tubes and Their Basic Principles," published by John Wylie and Sons, Inc., New York, 1952, pp. 61–65. This storage tube permits simultaneous write-in of new data and read-out of stored data. The tube is operated at a low-discharge factor. Discharge factor is defined in an article by A. S. Jensen, written in The RCA Review, volume 16, pp. 216–223, published June 1955, and entitled "Discharging an Insulator Surface by Secondary Emission Without Redistribution." The arrangement shown in FIGURE 3 is one which is described in more detail and claimed in an application for Method for Operating Barrier-Grid Storage Tubes, by Arthur R. Tobey, filed October 8, 1956, Serial No. 614,545.

In the arrangement shown in FIGURE 3, write-in is accomplished by applying the incoming signal from the resampling apparatus to the backplate 27, and read-out is accomplished by taking the signal provided at the collector electrode 29 by secondary emission from the target dielectric which passes through the barrier grid 30. The signal appearing at the collector is a distorted difference signal, consisting of the difference between the previously stored signal modified by aperture effects and the input signal not so modified. In order to recover the stored signal in usable form, it is necessary to subtract out the input-signal component. An attenuator and phase inverter 32 circuit has a portion of the incoming signal applied thereto, attenuates it and phase inverts it, and opposes it against the signal derived from the collector electrode 29. The result is that the signal being written into the barrier-grid storage tube is removed and the remaining components consist of signals which were stored previously. These are applied to a compensated amplifier 33, which incorporates high-peaking and aperture-correcting elements for the purpose of effecting corrections commonly required when using storage tubes, camera tubes, etc. The output of the compensated amplifier is the reconstructed video signal.

Advantage is taken in this circuit of the characteristics of the barrier-grid tube for obtaining integration which provides the same type of output as is obtained in FIGURE 2. The reconstructed video output which is obtained from the apparatus shown in either FIGURE 2 or FIGURE 3 may be expressed as $$\sum_{i=0}^{\infty} r^i e_{(n-i)}(\tau)$$

where $r$ is less than one and equals the loop gain in FIGURE 2. Where $e_n(\tau)$ represents the current frame of video, $\tau$ being a time variable limited to the frame. For the arrangement shown in FIGURE 3, $r$ above may be replaced by $1-x$, where $x$ is the discharge factor of the barrier-grid tube, and the read-out signal is delayed by one frame.

Details of the way difference components accomplish rapid revision of stored information in an integrator are best presented in a pair of simple quantitative examples. The first case will demonstrate what happens when standard video information is subjected to the sort of integration required by an interlace technique, and the second will show how the modified video signal accomplishes rapid revision in the reconstructed picture.

Let $e(\tau)$ represent the video amplitude in a television frame as $\tau$ varies between zero and the frame period. Assume further that for a large number of past frames the picture has been still, i.e., $e(\tau)$ has been identically repeated. This signal has been applied to the input of an integrator which assigns unit weight to the most recently received signal and weights decreasing by the constant ratio $r<1$ to successively older signals. The accumulated signal stored in the integrating device after a long series of still frames $e(\tau)$ will be $$e(\tau)[1+r+r^2+r^3+\ldots+r^n+\ldots]=(1-r)^{-1}e(\tau) \quad (1)$$

The ratio $r$ between the weights of successive frames must be near unity for good integration; therefore the factor $(1-r)^{-1}$ will be large. For the sake of concreteness, assume a value of $r=0.9$, which results in a stored signal $10e(\tau)$. (In practice, $r$ might be much nearer unity, and it will probably never be less than the 0.9 chosen in this example.)

Let us consider what happens when a change occurs in the picture information, resulting in a video signal $g(\tau)$ during the next following frame. Its weight will be unity at the integrator and the previously stored signal will be attenuated by the factor $r$, giving $g(\tau)+9e(\tau)$ for the stored signal after one frame of new information. The old signal is strongly predominant. Seven frames of $g(\tau)$ are required before this term becomes even slightly predominant, $5.2g(\tau)+4.8e(\tau)$, at which time confusion will be a maximum. Twenty-two repetitive frames will elapse before $g(\tau)$ comprises 90% of the stored signal. A transition of this sort is much too slow for the adequate portrayal of motion.

Let us next consider the behavior of a video signal modified in accordance with the concept developed above. For simplicity, let the modified signal be the sum of the current frame signal and the amplified difference between the current and just preceding frames. During the successive repetition of $e(\tau)$, no difference component exists, and the stored signal will become $(1-r)^{-1}e(\tau)=10e(\tau)$ as before. During the next frame, when the video signal is given by $g(\tau)$, the modified signal applied to the integrator will be $$g(\tau)+A[g(\tau)-e(\tau)]=(A+1)g(\tau)-Ae(\tau) \quad (2)$$

where A is the gain ratio applied to the difference component. As before, this signal is entered into the integrator with unit weight and the previously stored signal is attenuated by the factor $r$, resulting in a stored signal after a single frame of the new picture given by $$(A+1)g(\tau)-Ae(\tau)+r(1-r)^{-1}e(\tau) \quad (3)$$

If the gain factor A is set equal to $r(1-r)^{-1}=9$, the $e(\tau)$ component vanishes identically, and Eq. 3 reduces to $10g(\tau)$. Thus the new signal is established at full amplitude in the integrator in a single frame, independent of integration time.

This technique fulfills the requirement for long integration time in still areas and rapid revision in areas of motion. In the present example, sampling components present in the high-level difference signal would persist through a number of subsequent frames. More sophisticated differencing techniques can improve this situation. Although their analyses are more complex, the basic mechanism is the same. Revision of the accumulated signal is accomplished by introducing difference components with combined weights (determined by their amplitudes) equal to the sum of the weights of all previously-stored signals.

*Differencing operation*

A wide range of circuit configurations may be drawn which will, in principle, provide differencing and integration meeting the requirements of this band-width-reduction concept. The key blocks in all of these diagrams involve delay or storage of television signals for one or more frames. Practical limitations of technique determine which of these may be instrumented with any probability of success.

In order to match the differencing and integrating technique to the order of interlace, one must insert into the analysis one or more operators representing the sampling, filtering, and resampling operations (FIG. 1). These operations are: multiplication by the transmitter sampling signal $S_t$; multiplication by the low-pass filter transmission function $T(\omega)$; and, finally, multiplication by the receiver sampling signal $S_r$. The over-all operator may be designated by S.

$$S=S_r.T(\omega).S_t \quad (4)$$

This operator carries the time dependence of the sampling signals and exhibits a repetition period of N frames, or one cycle of interlace. In discussing video processing on a frame-by-frame basis it is therefore necessary to identify the part of the over-all operator during a given frame by means of a frame index. Thus $S_k$ will represent the operator which transforms the $k^{th}$ frame of Modified Wide-Band Video into the $k^{th}$ frame of Resampled Video. The operators $S_k$ obey the following relationships:

$$S_{k+N}=S_k \quad (5)$$

and $$\sum_k^N S_k=N \quad (6)$$

where N is the order of interlace and $$\sum_k^N$$

indicates summation over any N successive frames.

Equation 5 establishes the cyclic nature of the sampling operation, with a period of N frames. Equation 6 states that if some function which repeats at frame rate is sampled, filtered, and resampled for N successive frames and if these frames are then added with equal weights, the sum is the original function amplified by some numerical constant. In this case, the constant has been chosen as N, so that the average value of the sampled function is equal to the average value of the function itself, i.e., the over-all gain through the sampling, filtering, and resampling operations is thus adjusted to unity.

Summation with equal weights over precisely N frames of sampled video, per Eq. 6, would remove all evidence of sampling structure from viewed still pictures, as indicated by the absence of factors $S_k$ in the analysis following integration. As discussed previously, however, practical integrating techniques result in geometrically decreasing weights applied to older information and exhibit no sharp cut-off. If the sampling operator is introduced into the analysis of that section, the input signal in the $k^{th}$ frame becomes $S_k e(\tau)$ and the signal accumulated in the integrator after the $k^{th}$ frame will be $$[S_k+rS_{k-1}+r^2S_{k-2}+\ldots+r^nS_{k-n}+\ldots]e(\tau) \quad (7)$$

By means of Eq. 5, this may be written $$(1-r^N)^{-1}[S_k+rS_{k-1}+r^2S_{k-2}+\ldots+r^{N-1}S_{k-N+1}]e(\tau) \quad (8)$$

The square bracket of Eq. 8 includes N terms. Each of the $S_k$ occurring during a cycle of interlace is represented. As $r\rightarrow 1$, the square bracket approaches the summation of Eq. 6, and integration of sampling structure improves.

In practice, $r$ should be made no larger than necessary for the reconstruction of still pictures acceptable to the human eye, since, as will be shown, transmission signal-to-noise requirements increase sharply as $r\rightarrow 1$. The coarser the sampling structure and the more it tends to crawl, the nearer $r$ must approach unity to make the output picture palatable. Conversely, the finer the sampling structure and the less it crawls, the smaller $r$ can be.

The square bracket of Eq. 8 may be considered as a sampling operator which includes the integrating operation. Since it includes operator components from N successive frames, it exists only under still-picture conditions (or still portions of scenes which include localized motion), where the operand may be factored out. Since the gain associated with each of the $S_k$ operators is unity, the gain associated with the square bracket is $$1+r+r^2+\ldots+r^{N-1}=(1-r)^{-1}(1-r^N) \quad (9)$$

Let us write $$[S_k+rS_{k-1}+r^2S_{k-2}+\ldots r^{N-1}S_{k-N+1}]e(\tau) \cong(1-r)^{-1}(1-r^N)e'(\tau) \quad (10)$$

defining $e'(\tau)$ as an acceptable reconstruction of $e(\tau)$ as interpreted by a human observer from a television reproducer. This implies that a value of $r$ providing adequate integration for the order of interlace and the specific sampling scheme employed has been selected on the basis of viewing tests. The accumulated signal at the integrator after a long series of still frames $e(\tau)$ may thus be written as $$(1-r)^{-1}e'(\tau) \quad (11)$$

This corresponds to Eq. 1 of the earlier example, in which sampling effects were neglected.

Consider next an abrupt change of picture information such that the $(k+1)^{th}$ and all succeeding frames are characterized by the video signal $g(\tau)$. If simple frame-to-frame differencing is applied, the modified wide-band video signal will be given by Eq. 2 of the earlier example. After sampling, filtering, and resampling, this waveform arrives at the integrator modified by the operator $S_{k+1}$. This signal enters the integrator with unit weight, and the previously stored signal of Eq. 11 is attenuated by the factor $r$, resulting in a stored signal after the $(k+1)^{th}$ frame given by $$(A+1)S_{k+1}g(\tau)-AS_{k+1}e(\tau)+r(1-r)^{-1}e'(\tau) \qquad (12)$$

If A is adjusted to equal $r(1-r)^{-1}$, as before, this becomes $$(1-r)^{-1}\{S_{k+1}g(\tau)+r[e'(\tau)-S_{k+1}e(\tau)]\} \qquad (13)$$

Since the gain associated with the operator $S_{k+1}$ is unity, Eq. 13 indicates that the $g(\tau)$ signal is established at full amplitude in this single frame, subject, however, to the sampling structure associated with a single frame. Similarly, since the average value of the square bracket is zero, independent of $e(\tau)$, the old information is cancelled except for the difference between the integrated $e'(\tau)$ and a sampled single frame of $e(\tau)$. With simple frame-to-frame differencing, where the difference information due to a sudden scene change occurs only during a single frame, the sampling structure due to this frame necessarily persists for many following frames. In the present case, the integrated signal after the $(k+N)^{th}$ frame will be $$(1-r)^{-1}\{g'(\tau)+r^N[S_{k+1}g(\tau)-g'(\tau)] + r^N[e'(\tau)-S_{k+1}e(\tau)]\} \qquad (14)$$

where $g'(\tau)$ represents an acceptable reconstruction of the video picture $g(\tau)$ and is mathematically defined in Eq. 10. The square brackets in Eq. 14 are unwanted residual structure due to the transition between scenes. If $r=0.9$, as used for illustration in the earlier example, and $N=9$ frames per interlace cycle, $r^N=0.39$ and the structure is seen to retain significant amplitude after a full cycle of interlace.

Sampling structure resulting from scene changes or motion can be made to interlace if the difference component of the modified wide-band video signal due to an abrupt change is made to persist through all frames of a cycle of interlace. Consider a system employing N-frame delay or storage at the transmitter terminal and taking differences between frames separated in time by N-frame periods. The $n^{th}$ frame of modified wide-band video would be $$f_n(\tau)=(A+1)e_n(\tau)-Ae_{n-N}(\tau) \qquad (15)$$

Assume, as before, that $e_n(\tau)=e(\tau)$ for all $n\leqq k$ and $e_n(\tau)=g(\tau)$ for all $n>k$. Then the modified video signal will be given by $$f_n(\tau)=e(\tau) \text{ for } n\leqq k$$
$$f_n(\tau)=(A+1)g(\tau)-Ae(\tau) \text{ for } k<n\leqq k+N$$

and $$f_n(\tau)=g(\tau) \text{ for } n>k+N \qquad (16)$$

Signals $S_nf_n(\tau)$ appear at the integrator input. The integrator need not be altered from that used in the previous case, and the integrated output during the $k^{th}$ and $(k+1)^{th}$ frames will be given by Eqs. 11 and 12. In this case, however, before determining the appropriate amplifier gain A we will look at the integrated signal after the $(k+N)^{th}$ frame, which is $$[S_{k+N}+rS_{k+N-1}+ \cdots +r^{N-1}S_{k+1}][(A+1)g(\tau) -Ae(\tau)]+r^N(1-r)^{-1}e'(\tau) \qquad (17)$$

The N terms in the first square bracket of Eq. 17 constitute the operator defined in Eq. 10. Thus no non-integrated single-frame sampling structure appears on the $(k+N)^{th}$ frame, which may be written as $$(1-r)^{-1}\{(1-r^N)(A+1)g'(\tau)-[(1-r^N)A-r^N]e'(\tau)\} \qquad (18)$$

In this case, the appropriate gain factor is $A=r^N(1-r^N)^{-1}$, and the reconstructed signal for all frames $n\geqq k+N$ is $(1-r)^{-1}g'(\tau)$. The square brackets of Eq. 14, representing unwanted sampling structure, have been eliminated completely in one cycle of interlace by the employment of N-frame delay at the transmitter.

Insertion of numerical values into the gain expressions reveals a second and very important advantage of techniques in which the difference component is made to persist for a number of frames. Taking $r=0.9$, as before, the gain factor appropriate to one-frame delay is $A=r(1-r)^{-1}=9$, whereas the same factor evaluated for N-frame delay with $N=9$ is $A=r^N(1-r^N)^{-1}=0.63$—very much smaller! The gain factor A determines the dynamic range of the modified video signal. The latter factor largely determines the signal-to-noise requirement of the transmission or recording link. Therefore, persistence of the difference component for a number of frames following an abrupt transition in the input video will permit better use of available signal-to-noise capabilities of the system than simple one-frame delay and differencing techniques.

The latter point deserves emphasis. The designer faces a compromise. Any realizable transmission or recording channel will have a limited signal-to-noise capability for a given bandwidth equalization. Given this characteristic for a particular type of channel, the designer must optimize the reconstructed picture which may be transmitted. A small value of $r$ (the weighting ratio in recirculating storage) will minimize the dynamic range of the transmitted signal, providing high signal-to-noise ratio at the output but poor suppression of sampling structure. A value of $r$ nearer unity, on the other hand, will improve integration of sampling effects at the cost of increased dynamic range in the transmitted signal and poorer signal-to-noise ratio in the reconstructed picture. As compared with single-frame delay and differencing, techniques which repeat the difference component, such as N-frame delay and differencing, will permit a larger value of $r$ to be chosen with less cost in dynamic range and signal-to-noise performance. In the present example, for instance, the designer could increase the weighting ratio to $r=0.96$, greatly improving integration with a gain factor $A=2.25$ for N-frame delay. The same quality of integration with one-frame delay and differencing at the transmitter would require a prohibitive value of $A=24$.

Delay or storage of wide-band video signals for periods of 1/30 of a second or more is difficult and expensive. The equipment cost for N-frame delay or storage is likely to approach N times that for one-frame instrumentation. Consequently, techniques for obtaining the desirable persistence of the difference component through a number of frames with one-frame delay or storage devices have been derived. One such technique, which will be illustrated in the following example, employs recirculating storage at the transmitter terminal.

Let the unmodified input video $e(\tau)$ be averaged in a recirculating storage loop at the transmitter with a weighting ratio $t<1$. Consider the averaged value, obtained by attenuating the integrated value by $(1-t)$. During the $n^{th}$ frame period, the delayed output will be the following weighted average of all previous video frames through the $(n-1)^{th}$ $$(1-t)[e_{n-1}(\tau)+te_{n-2}(\tau)+t^2e_{n-3}(\tau)+ \ldots ] \qquad (19)$$

The difference component during the $n^{th}$ frame is obtained by subtracting Eq. 19 from the current-frame signal $e_n(\tau)$. Multiplying the difference component by A and adding the unmodified $e_n(\tau)$ at unit amplitude produces the modified video signal for the $n^{th}$ video frame, which is $$f_n(\tau)\equiv(A+1)e_n(\tau)-A(1-t)[e_{n-1}(\tau) +te_{n-2}(\tau)+t^2e_{n-3}(\tau)+ \cdots] \qquad (20)$$

Assume, as before, that $e_n(\tau)=e(\tau)$ for all $n\leqq k$ and $e_n(\tau)=g(\tau)$ for all $n>k$. Then the modified video signal will be given by $$f_n(\tau)=e(\tau) \text{ for } n\leq k$$
$$f_{k+1}(\tau)=(1+A)g(\tau)-Ae(\tau)$$
$$f_{k+2}(\tau)=(1+At)g(\tau)-Ate(\tau)$$
$$f_{k+3}(\tau)=(1+At^2)g(\tau)-At^2e(\tau)$$
$$\cdot\ \cdot\ \cdot\ \cdot\ \cdot$$
$$f_{k+m}(\tau)=(1+At^{m-1})q(\tau)-At^{m-1}e(\tau) \quad (21)$$

The above expressions may also be written in the form $$f_{k+m}(\tau)=g(\tau)+At^{m-1}[g(\tau)-e(\tau)] \quad (22)$$

which illustrates the manner in which the difference component (square bracket) is attenuated geometrically frame by frame. The lack of sharp cut-off after the $N^{th}$ frame is the chief difference between this case and that employing N-frame delay.

Signals $S_nf_n(\tau)$ appear at the integrator input. The integrator with weighting ratio $r$, need not be altered from that used in previous cases, and the integrated output during the $k^{th}$ and $(k+1)^{th}$ frames will be given by Equations 11 and 12. As in the previous example, let us look at the integrated signal during the $(k+N)^{th}$ frame, which is $$(1-r^N)(1-r)^{-1}g'(\tau)+A[t^{N-1}S_{k+N}rt^{N-2}S_k +N-1+r^2t^{N-3}S_{k+N-2}+\cdot\cdot\cdot+r^{N-2}tS_{k+2} +r^{N-1}S_{k-1}]\,[g(\tau)-e(\tau)]+r^N(1-r)^{-1}e'(\tau) \quad (23)$$

with some simplification by means of Equation 10. The first square bracket of Equation 23 contains N operator terms and is similar to the operator defined in Equation 10. In this case, two weighting factors occur, $t$ and $r$, in ascending and descending powers. Since the gain associated with each of the operators $S_n$ is unity, the gain associated with the square bracket is $$t^{N-1}+rt^{N-2}+r^2t^{N-3}+\cdot\cdot\cdot+r^{N-2}t+r^{N-1} =(r^N-t^N)(r-t)^{-1} \quad (24)$$

As in Equation 10, let us write $$[t^{N-1}S_{k+N}+rt^{N-2}S_{k+N-1}+r^2t^{N-3}S_{k+N-2} +\cdot\cdot\cdot+r^{N-2}tS_{k+2}+r^{N-1}S_{k+1}]e(\tau) \equiv(r^N-t^N)(r-t)^{-1}e''(\tau) \quad (25)$$

where $e(\tau)$ may be replaced by any other function which is repetitive at frame frequency, such as $g(\tau)$. Substituting Equation 25 in Equation 24 and rearranging, the integrated signal during the $(k+N)^{th}$ frame becomes $$(1-r)^{-1}g'(\tau)+A(r^N-t^N)(r-t)^{-1}[g''(\tau) -e''(\tau)]-r^N(1-r)^{-1}[g'(\tau)-e'(\tau)] \quad (26)$$

If we adjust $A=(r-t)(1-r)^{-1}$, we can rearrange Equation 26 into the following form.

$$(1-r)^{-1}\{g'(\tau)+r^N[g''(\tau)-g'(\tau)-e''(\tau)+e'(\tau)] -t^N[g''(\tau)-e''(\tau)]\} \quad (27)$$

Selection of parameter values is somewhat more complicated here than with N-frame delay. The first term, $(1-r)^{-1}g'(\tau)$, is the desired component of reconstructed video, and the visibility of the other terms must be minimized.

The second term of Equation 27 appears with the coefficient $r^N$, which will not be negligible, since $r$ must be near unity for adequate receiver integration. The square bracket of the second term is sensitive to the value of $t$ through $e''(\tau)$ and $g''(\tau)$, however, permitting the amplitude and visibility of this term to be minimized. Comparison of Equations 25 and 10 using Equation 5 shows that as $t\rightarrow1$, $e''(\tau)\rightarrow e'(\tau)$ and $g''(\tau)\rightarrow g'(\tau)$, tending to eliminate the bracket entirely. Further inspection of Equation 25 shows that for $t=r$, the ascending and descending powers of these parameters compensate each other and perfect integration is obtained, giving $e''(\tau)=e(\tau)$ and $g''(\tau)=g(\tau)$. Since the other terms in the square bracket of the second term represent adequately reconstructed video signals, this choice of $t$ would provide visual elimination of the second term. The difference terms $e'(\tau)-e(\tau)$ and $g(\tau)-g'(\tau)$ would not be visible in the presence of the properly reconstructed video component. In practice, $t$ will have to be less than $r$ for adequate suppression of the third term of Equation 27. As $t$ is reduced below $r$, the tendency for components of the second term to become visible will increase.

The third term of Equation 27 is the residual difference component due to lack of sharp cut-off of the transmitter averaging process. Its amplitude and visibility are completely determined by the transmitter weighting ratio $t$ through the coefficient $t^N$. For $N=9$, a choice of $t=0.6$ would make $t^N=0.01$, providing 40 db suppression of this term. In practice, some comprise value $0.6<t<r$ will have to be selected, probably on the basis of viewing tests. Some value in this range should provide minimum visibility of unwanted components during motion sequences.

Signal-to-noise considerations enter into the selection of $r$ and $t$ through the gain factor A. The general argument is the same as that given in the discussion of N-frame delay. Table V gives a few representative values of A for a range of choices of $r$ and $t$.

TABLE V

Gain Factor $A=\frac{r-t}{1-r}$

| r | 0.98 | 0.97 | 0.96 | 0.95 | 0.94 | 0.92 | 0.90 |
|---|---|---|---|---|---|---|---|
| t=0.90 | 4.0 | 2.3 | 1.5 | 1.0 | 0.7 | 0.25 | 0.0 |
| 0.85 | 6.5 | 4.0 | 2.75 | 2.0 | 1.5 | 0.875 | 0.5 |
| 0.80 | 9.0 | 5.7 | 4.0 | 3.0 | 2.3 | 1.5 | 1.0 |
| 0.75 | 11.5 | 7.3 | 5.25 | 4.0 | 3.2 | 2.125 | 1.5 |
| 0.70 | 14.0 | 9.0 | 6.5 | 5.0 | 4.0 | 2.75 | 2.0 |
| 0.65 | 16.5 | 10.7 | 7.75 | 6.0 | 4.8 | 3.375 | 2.5 |
| 0.60 | 19.0 | 12.3 | 9.0 | 7.0 | 5.7 | 4.0 | 3.0 |

Figure 4:
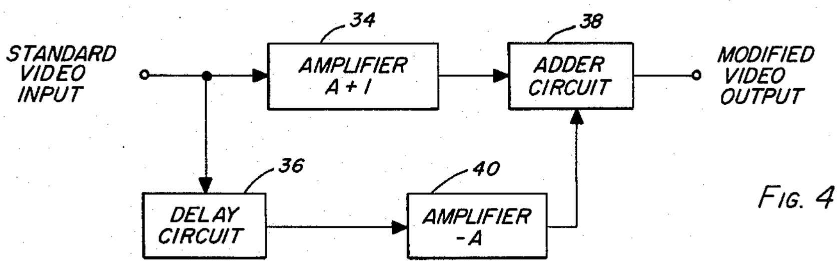
FIGURE 4 is a block diagram of an arrangement for differencing apparatus at a transmitter in accordance with this invention, which employs delay techniques.

FIGURE 4 is a block diagram of an arrangement for differencing, which employs delay techniques. The standard video input from a source 10 is applied to an amplifier 34, which has a gain equal to $A+1$. It is also applied to a delay circuit 36. The output of the amplifier 34 is applied to an adder circuit 38; the output of delay circuit 36 is applied to an amplifier 40, having a gain of $-A$. Amplifier 40 output is applied to the adder circuit 38, and the resultant, comprising the modified video output, can be applied to the sampling circuit 14, as shown in FIGURE 1. It should be noted that for a one-frame delay, the value of A is equal to $r(1-r)^{-1}$. For an N-frame delay, the value of A is equal to $r^N(1-r^N)^{-1}$.

Figure 5:
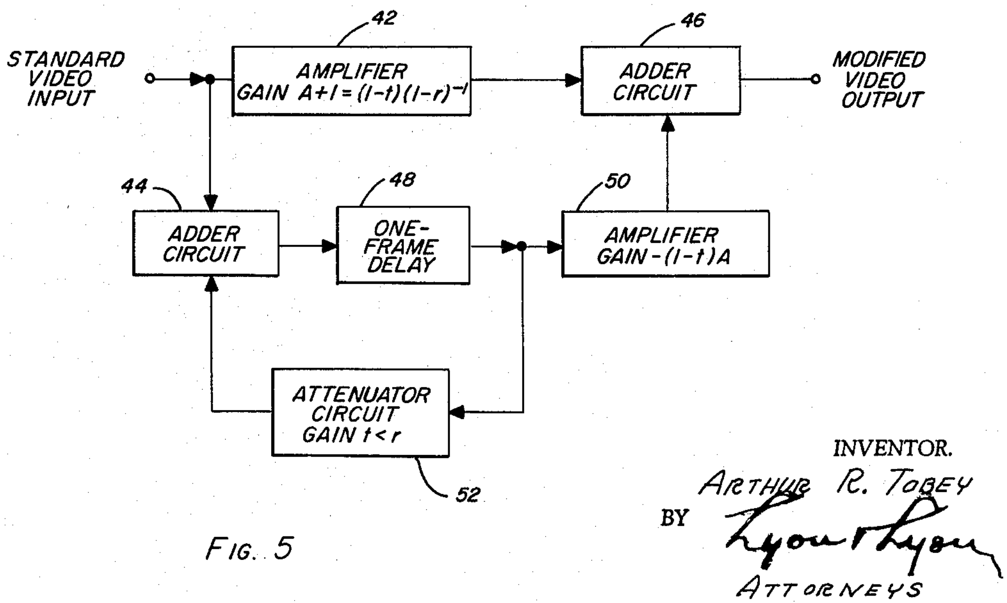
FIGURE 5 is a block diagram of an arrangement for differencing apparatus at a transmitter in accordance with this invention, which employs recirculating storage techniques.

FIGURE 5 is a block diagram of a differencing operation arrangement wherein recirculating storage is employed. In FIGURE 5, the video input signal is applied to an amplifier 42, having a gain of $A+1$, and also to an adder circuit 44. This time, the amplifier gain $A+1$ is made equal to $(1-t)(1-r)^{-1}$. The output of the amplifier 42 is applied to another adder 46. A recirculating storage loop for supplying the second adder input will include a one-frame delay circuit 48, the output of which is applied to an amplifier 50 and to an attenuator 52. The amplifier 50 has as its gain established as $-(1-t)A$.

In the block diagram shown in FIGURE 4, when there is no change from frame to frame in the standard video signal input, then the adder combines the outputs of amplifiers 34 and 40, which respectively have gains of $A+1$ and $-A$, so that the output of the adder is the signal at unity gain which is applied to the amplifier 34. When there is a change between frames in the signal which is applied to the input, then the change in signal is amplified by a factor A, and that is the signal which the adder 38 transfers to the subsequent circuitry. Note that the unmodified, or unchanging, information always comes through with the same amplitude with which it was applied, or the gain is unity, whereas the new information comes through amplified with a gain equal to A.

When the delay time for delay circuit 36 (FIGURE 4)

is established for N-frames, then when a changed-information frame occurs, the changed information will pass through the direct feed-through circuit, consisting of amplifier 34 and adder 38, modified by the old information for a number of frames until the $N^{th}$ frame occurs. At this time, whatever information is passing through the straight feed-through path will be modified by whatever changed information occurred N frames ago. Alternatively expressed, for a sudden change in signal, a differencing signal is experienced for N frames, whereas, when the delay is for only one frame, a sudden change in signal is experienced during only one frame.

FIGURE 5 essentially is the same as FIGURE 4, except that for the delay 36 there has been substituted an integrating loop such as is shown in FIGURE 2. Here also, where there are substantially no changes from frame to frame, then the structure shown will pass through the input signal with a gain of one. However, where a change does occur in a frame, the difference signal component is maintained with a geometrically decreasing amplitude over an interval determined by the attenuation constant $t$ in the integrating loop. Alternatively expressed, the output of the circuit is a difference signal, when there is a change, which has its amplitude decreased until what is left is the new signal which initiated the differencing.

Previously it was stated that the storage tube in FIGURE 3 and its associated circuitry is the equivalent of the circuitry shown in FIGURE 2. Since it will be observed that in FIGURE 5 the adder 44, one-frame delay 48, and attenuator 52 are substantially identical with the circuitry shown in FIGURE 2, then logically the circuitry shown in FIGURE 3 may also be substituted in FIGURE 5, with substantially the same results obtained. However, when this is done, the barrier-grid storage tube should be operated at a discharge factor $X=(1-t)$ and the gain of the amplifier 50 should be changed to $-A$, which equals $-(r-t)(1-r)^{-1}$.

*Sampling operation*

The arrangement described thus far is one wherein integration is employed to remove sampling structure from a highly interlaced video picture. The differencing technique is employed so that changes in the picture may occur rapidly where required, despite the presence of the integrating circuits. Accordingly, in order to reduce the burden upon the integrating circuits, it is best to obtain sampling signals which when reproduced will inherently produce minimum visibility. In accordance with this invention, there will be described a technique for obtaining sampling signals capable of producing minimum visibility.

Sampling inevitably introduces a spurious structure into the reconstructed video signal. Even if integration were perfectly performed, sampling structure would appear under transient conditions in regions of motion. The eye fixes on regularity of pattern and is coerced into following any regular motion of pattern or structure. The technique presented herein has been aimed at the development of sampling waveforms with a minimum of structure regularity and as little tendency to "crawl" as possible. An ideal sampling waveform would be one with the appearance of random noise.

By the use of Fourier concepts, pulse sampling may be analyzed as a combination of simultaneous heterodyning processes. 2W samples per second are required to abstract all available information from a signal of bandwidth W c.p.s., according to the Nyquist criterion. In an N-fold interlace, the information transmission rate is reduced by the factor N, giving $2W/N$ for the sampling rate. If uniformly-spaced pulses of constant wave-shape are utilized for sampling, the Fourier components of the sampling signal will be given by $2nW/N$, where $n=1, 2, 3,$ etc. At the transmitter, each Fourier component may be thought of as heterodyning a band of video frequencies extending $W/N$ c.p.s. above and below it into the band $O-W/N$ c.p.s. Resampling at the receiver heterodynes each signal component from the $O-W/N$ c.p.s. frequency interval into the band of its origin and into every other sub-band of width $W/N$ c.p.s. adjacent to a Fourier component of the sampling signal.

FIGURE 6 is a graph which illustrates the sampling process at the transmitter. The input video band extends indefinitely along the abscissa to W c.p.s. The band of output frequencies extends indefinitely along the ordinate and is plotted on the same scale as that of the abscissa. The output band will extend W c.p.s. beyond the frequency of the highest signficant Fourier component of the sampling waveform. Fourier components of the sampling signal are indicated by arrows along the ordinate. Only those components within the bandwidth W c.p.s. are of importance to the sampling process.

The principal diagonal of positive slope (long dashes) in FIG. 6 results from the D.-C. component of the sampling signal, and the other diagonals are sideband structures around each of the Fourier components of the sampling waveform. Lower sidebands are reflected at zero output frequency with reversal of slope.

A vertical line in FIG. 6 through any given abscissa intersects a number of diagonal lines. The ordinates of these intersections are output frequency components resulting from the given input frequency. FIGURE 6 thus maps the input frequency spectrum onto the output frequency axis in a highly redundant manner. The significant feature of this redundancy, in the transmitter operation, is that every frequency in the W-c.p.s. band of input frequencies is represented by an output component lying between O and $W/N$ c.p.s.

Although frequency components fill a wide band, the signalling rate at the output of the transmitter sampler is only $2W/N$ independent signal elements per second. Frequency components above $W/N$ c.p.s. may be removed by filtering without further loss of information. Frequency components retained after filtering are indicated in FIG. 6 by full lines.

Recovery of high-frequency components from the band-limited video requires resampling at the receiver. FIGURE 7 is a graph which illustrates this process. The receiver input is the filtered transmitter output, and this is copied (long dashes) from the solid line of FIG. 6. The abscissa in FIG. 7 is "parent video frequency," i.e., transmitter input video frequency, as in FIG. 6. Sampled output frequency is again plotted along the ordinate, with sampling components indicated by horizontal arrows. Since the input is band-limited to $W/N$ c.p.s., sideband structures around each of the Fourier components now extend only $W/N$ c.p.s. (maximum) above and below them. These have been drawn (short dashes) completely only for even harmonics of $2W/N$ c.p.s. in order to show this structure. If the sidebands are completely drawn for all harmonics and the frequencies are the same in both transmitter and receiver sampling operations, all of the diagonal lines will become continuous.

Resampling heterodynes the narrow-band receiver input signal into every interval of band-width $W/N$ c.p.s. adjacent to a Fourier component of the sampling waveform, thus reestablishing the redundancy removed by filtering (though not necessarily recreating the same waveform). Segments of the input signal and various sidebands combine to reestablish the principal diagonal of the diagram (solid line in FIG. 3), which maps the parent video spectrum directly onto the output frequency axis with no shift in frequency.

It is convenient to refer to video components mapped into the output via the principal diagonal (full line) of FIG. 7 as "properly reconstructed" or "desired" components, Frequencies mapped into the output via other diagonals (dashed lines) are "improperly reconstructed" or "undesired" components of the output video. There is no a priori way of determining which components in a single frame of output video are properly reconstructed. A set of N frames of output video must be examined to separate the desired components from the improperly reconstructed ones, as a consequence of the fact that interlace techniques trade transmission time for bandwidth.

The Fourier concept is of further utility in understanding the operation of interlace. For a still picture, the input (or parent) video spectrum will be discrete, all frequency components being Fourier harmonics of the frame frequency. The spectrum mapped onto the output-frequency axis of FIG. 7 will also be discrete. The output signal will be displayed in a recurrent manner at the same frame rate as the input, therefore only output frequency components which are multiples of the frame frequency are Fourier components of a reproduced picture. Output frequency components displaced from harmonics of the frame frequency will occur with varying phases during successive frames. Thus if successive frames of output signal are summed or averaged over a sufficiently long period, components that are multiples of the frame frequency will persist and those that are displaced from the Fourier harmonic series will vanish.

Output frequency components mapped via the principal diagonal of FIG. 7 retain their parent frequencies and are thus reconstructed as Fourier components of the output picture. Output frequency components mapped via other (dashed) diagonals may be shifted along the frequency axis by varying the sampling frequencies. Development of an N-fold interlace using a continuous sampling signal involves the selection of sampling frequencies such that all undesired frequency components of the output signal sum or average to zero over a cycle of N frames of video. This is accomplished by adjusting the sampling rate to some multiple, not containing N, of $1/N$ times the frame rate, thus shifting the sampling components and the improperly reconstructed output frequency components away from the Fourier harmonic series characteristic of picture information. With such a choice of sampling frequencies, phase vectors associated with the undesired output frequency components will rotate through some multiple, not containing N, of 360 degrees in N frames of video.

Common sampling practice employs rectangular pulse trains. Applied to television video for the purpose of developing a high-order interlace, such waveforms exhibit a maximum of structure regularity. Furthermore, this structure pattern moves in a regular manner from frame to frame, exhibiting an unavoidable "crawl," since all components of the pattern are subject to the same time-shift per frame.

The gross appearance of rectangular-pulse-sampled video may be analyzed by looking at some details of the sampling waveform. As pointed out above, only Fourier components falling within the frequency band of the parent video are required for sampling. The amplitudes of these components should be very nearly equal, however, requiring the use of narrow pulses, since the amplitude coefficients of the Fourier components of a rectangular pulse train vary according to $$a_n=\frac{T}{\pi nd}\sin\frac{\pi nd}{T} \qquad (28)$$

where $a_n$ is the amplitude of the $n^{th}$ Fourier harmonic,
$T$ is the pulse recurrence interval, and $d$ is the pulse duration.

Thus if $d/T$ is made small, to keep the first few coefficients near unity ($\lim a_n=1$ as $d/T\to 0$), higher frequency terms unnecessary to the sampling operation are automatically retained with near-unity amplitudes.

A more serious characteristic of rectangular pulse sampling is the fixed phase relationship among the Fourier components. All frequency components in a rectangular pulse train out to the first zero of Equation 28 achieve maximum values in the same direction at the center of each pulse. This results, first, in the maximum peak amplitude attainable with a given set of frequency components, thus achieving maximum visibility. Second, the waveform must be advanced or delayed as a whole to attain interlace, thus imparting a regular motion in a single preferred direction to this highly visible structure.

Study of the sampling process from the point of view exemplified by FIGS. 6 and 7 reveals that the high degree of regularity exhibited by rectangular pulses is not required. In particular, the sampling component frequencies need not be exactly harmonically related and phase shift per frame introduced for developing interlace need not be proportional to frequency, i.e., operations other than advancing or delaying the waveform may be performed. In short, it is possible to employ synthetic sampling signals consisting of the required frequency components (and no unnecessary ones) which exhibit a wide range of characteristics.

Waveshape, which must be at least approximately periodic over the equivalent pulse recurrence interval T, may be made to vary from frame to frame or continuously over an N-frame cycle of interlace. Phasing of components to develop high-order interlace may be arranged so that "crawl" effects associated with the several component frequencies tend to oppose each other. Freedom of this sort from the regularity of rectangular-pulse sampling permits an approach toward a random-appearing sampling structure which should, in the limit, exhibit minimum visibility in a reconstructed picture.

A set of minimum restrictions on the choice of sampling component frequencies and phase variations may be obtained as necessary and sufficient conditions to the development of interlace. These may be derived by carrying through the trigonometry of the modulation processes illustrated in FIGS. 6 and 7 using a set of sampling frequencies whose phases at corresponding times in successive frames may be independently varied. The phase of a reconstructed video component will, in general, be a linear combination of the phase of the parent video component and the phases of the sampling components which have heterodyned it at the transmitter and receiver. Since only the phase variation of these reconstructed components over a cycle of interlace is important to the development of interlace, non-varying phase components may be neglected. The phase of the parent video component falls in the latter class, its phase repeating without change during successive frames since its frequency must be a Fourier harmonic of the frame rate. Thus interlace may be discussed in terms of linear combinations of the instantaneous phases of the sampling frequency components and their variation at corresponding times in successive frames over a cycle of interlace.

Components represented in FIG. 7 by a given diagonal line segment of length $\sqrt{2}W/N$ between intersections are subject to the same phase modification. The appropriate phase angles could be written along the diagonals of that figure. FIGURE 8 is a more convenient representation of this in table form. Coordinates of the matrix are the same as those of FIG. 7. Each square in FIG. 8 encloses the space occupied by a diagonal segment in FIG. 7 and contains the phase parameters appropriate to that segment.

FIGURE 8 has the significance that video components originating in any range of parent video frequencies $W/N$ c.p.s. wide and reconstructed into any output video sub-band $W/N$ c.p.s. wide will exhibit frame-to-frame phase variations in accordance with the phase angle occupying the appropriate matrix position. The individual $\phi_{nk}$ are the instantaneous phases of the sine-wave sampling components ($n=1, 2, 3 \ldots$ starting with the lowest-frequency component) at some selected time during the $k^{th}$ video frame.

Phase angles of the derived components along the principal diagonal of FIG. 8 are zero. This will be true, independent of what phasing assignments are made, provided only that the phases of the sampling components are the same at corresponding picture points during the transmitter and receiver sampling operations. In practice, where transmitter and receiver may be widely separated geographically, or recording and playback may occur at different times, this requires that the sampling components be locked to the television synchronizing signals or to some reference signal transmitted or recorded with the narrow-band video specifically for this purpose.

The necessary and sufficient conditions for developing an N-fold interlace are simply mathematical statements of the fact that the non-diagonal components of FIG. 8 must vanish when summed over N frames. The symbol $\phi_{nk}$ has been defined as the instantaneous phase of the $n^{th}$ sine-wave sampling component at some instant chosen at random during the $k^{th}$ frame of video. Let $\phi_{mk}$ equal the instantaneous phase of any other sine-wave sampling component at the same instant during the $k^{th}$ frame interval. Where sets of instantaneous quantities are considered by varying the frame index, $k$, it is to be understood that these quantities are evaluated at corresponding times in their respective frame intervals. Corresponding times in successive frames are those at which the same picture point is scanned; thus corresponding instants occur at the frame repetition rate. The phasing requirements may be stated as follows:

(1) The instantaneous phase vectors taken at corresponding instants in N successive frames for any sampling component must add to zero. Mathematically $$\sum_{k}^{N} \exp j\ \phi_{nk}=0 \text{ for all } n \tag{29}$$

where $$\sum_{k}^{N}$$

indicates summation over any N successive frames, and $j=\sqrt{-1}$. This requirement has the corollary that the phases of each of the components repeat in a cycle of N or some submultiple of N frames. Mathematically $$\phi_{n(k+N)}=\phi_{nk} \text{ for all n} \tag{30}$$

(2) The vectors taken at corresponding instants in N successive frames formed by adding the instantaneous phases of any two sampling components must add to zero. Mathematically, $$\sum_{k}^{N} \exp j\cdot(\phi_{nk}+\phi_{mk})=0 \text{ for all } n, m \text{ except } m=n \tag{31}$$

(3) The vectors taken at corresponding instants in N successive frames formed by taking the difference between the instantaneous phases of any two sampling components must add to zero. Mathematically, $$\sum_{k}^{N} \exp j\cdot(\phi_{nk}-\phi_{mk})=0 \text{ for all } n, m \text{ except } m=n \tag{32}$$

(4) With the exception of the highest-frequency sampling component in even-order interlace, the sum of the vectors taken at corresponding instants in N successive frames formed by doubling the instantaneous phase of any sampling component must add to zero. Mathematically, $$\sum_{k}^{N} \exp j\cdot 2\phi_{nk} \text{ for all } n \text{ except } n=N/2 \tag{33}$$

The exception made with respect to $n=N/2$ for even-order interlace in the last condition bears explaining. Consider the highest even-order case covered by the extent of FIG. 8, namely $N=8$. Proper interlacing of all components within the square bounded by the $8W/N=W$ ordinate and abscissa requires Conditions 1–4, allowing only the exception for $2\phi_{4k}$, which occurs in the adjacent column and row, but not in the 8 by 8 matrix. If it were possible to satisfy Conditions 1–4 without the stated exceptions, all elements of the 9 by 9 matrix would interlace properly. Thus a nine-fold bandwidth compression would be obtained with an eight-fold increase in transmission time. But this is clearly in contradiction with the conservation principle that the product of bandwidth and transmission time must remain constant. Detailed investigation confirms that with Conditions 1–3 in force, Condition 4 can be satisfied for only $N/2-1$ of the $N/2$ sampling components required for even-order interlace. The exception must be assigned to the highest component, at the band limit W, in order to preserve interlace within the N by N matrix.

Due to the presence of the non-interlacing component in the $(N+1)^{th}$ column of FIG. 8, components which may be present above W c.p.s. in the parent video will be incorrectly reconstructed within the W-c.p.s. output band. Such components, if initially present, must be removed by input filtering if even-order interlace is employed. Similarly, output filtering may be desirable to remove the non-interlacing component in the $N^{th}$ column and $(N+1)^{th}$ row.

Inspection of FIG. 8 shows that no such complications occur for odd-order interlace. Conditions 1–4 may be met without exception, and no input or output filtering is required provided the sampling components are free of harmonic distortion. Only $(N-1)/2$ sampling frequencies are required for odd-order interlace, i.e., no more than for the next lower even-order case. Therefore, from the standpoint of greater flexibility in the choice of phasing parameters reduced filtering requirements, and increased instrumentation efficiency, odd-order interlace is preferred.

Up to this point, only frequencies and phases of the sampling components have been discussed. Amplitudes of these sinusoidal components must also be specified. Let $A_{nt}$ and $A_{nr}$ be the amplitudes of the $n^{th}$ sampling component (frequency $f_n$ approx. $2nW/N$ c.p.s.) in the transmitter and receiver sampling signals, respectively. Let the D.-C. term, which essentially determines the gain through the modulation process, be taken as unity at both the transmitter and receiver. Thus, for the $k^{th}$ frame, the sampling signals are $$S_t=1+\sum_{n=1}^{\frac{N-1}{2}\text{ or }\frac{N}{2}} A_{nt} \sin\left[2\pi f_n(t-t_k)+\phi_{nk}\right] \tag{34}$$

at the transmitter, and $$S_r=1+\sum_{n=1}^{\frac{N-1}{2}\text{ or }\frac{N}{2}} A_{nr} \sin\left[2\pi f_n(t-t_k)+\phi_{nk}\right] \tag{35}$$

at the receiver, where $t_k$ designates a particular instant in the $k^{th}$ video frame for the purpose of establishing correspondence.

For the faithful reconstruction of input video components with their original amplitudes, the product of the amplitude of each frequency component in the transmitter sampling signal and the amplitude of the same frequency component in the receiver sampling signal must equal four. Mathematically, $$A_{nt}\cdot A_{nr}=4 \text{ for all } n \tag{36}$$

Since each sampling frequency component is concerned with the reconstruction of a frequency band of width $2W/N$ c.p.s., variation of the value of the above product can be used to shape the amplitude characteristic of the system, if this should be desirable.

Summarizing the theoretical development, it is possible to utilize the wide range of sampling waveforms other than the conventional rectangular pulse train for the purpose of achieving a high-order interlace. Sampling waveforms may be synthesized in the form given by Eqs. 34 and 35, where the $f_n$ need only be approximately harmonically related, provided only that Conditions 1–4 Equations 29–33 are satisfied. Finally, the relation Eq. 36 states the condition for flat amplitude response through the sampling and resampling processes.

Nine-fold interlace requires sampling waveforms synthesized from a D.-C. term and four sinusoidal components. The frequencies of the latter must be approximately $2W/9$, $4W/9$, $6W/9$ and $8W/9$, where W is the bandwidth of the parent video signal. The instantaneous phases of each of the sinusoidal components, measured at corresponding instants in successive frames, will rotate through some multiple of 360 degrees in nine frames, though not necessarily uniformly. Table I is a very systematic ordering of a possible set of instantaneous phases. The first column of

TABLE I

[Degrees]

| | | | |
|---|---|---|---|
| 0 | 0 | 0 | 0 |
| 40 | 80 | 120 | 160 |
| 80 | 160 | 240 | 320 |
| 120 | 240 | 0 | 120 |
| 160 | 320 | 120 | 280 |
| 200 | 40 | 240 | 80 |
| 240 | 120 | 0 | 240 |
| 280 | 200 | 120 | 40 |
| 320 | 280 | 240 | 200 |

the table is generated by adding $360/N=40$ degees to each successive entry starting with zero. Entries in the $i^{th}$ column increase by $360i/N=40i$ degrees. The number of columns is equal to the number of sinusoidal components in the sampling wave, and the number of rows is equal to the order of interlace, i.e., to the number of frames of video in a cycle of interlace.

It may be readily demonstrated that if each column of Table I is associated with a sampling component and each row with a video frame, Conditions 1–4 Equations 29–33 are satisfied. Furthermore, the conditions remain satisfied under a number of row and column assignments and modifications to the table:

(1) All permutations in the assignment of sampling components to columns of Table I are permissible.

(2) All permutations in the assignment of video frames to rows of Table I are valid provided the same cyclic order is repeated through successive cycles of interlace.

(3) An initial-phase constant may be added to all elements of any column of Table I. Different constants may be added to each of the columns.

(4) The signs of all elements in any column of Table I may be changed.

Rectangular-pulse sampling corresponds to only a few of the many cases which can be generated from Table I. These cases are characterized by the following restrictions.

(1) Fourier components of the rectangular pulse train are assignable to columns of Table I only in order of increasing frequency.

(2) Only one initial-phase constant is independent. If the pulse train is represented by a Fourier cosine series, the relative phases shown in Table I must be maintained.

(3) The same algebraic sign must apply to all columns of Table I.

Finally, the sinusoidal components are exactly harmonically related in rectangular-pulse sampling, and the amplitude condition of Equation 36 can be achieved only approximately and at the expense of including higher harmonics unnecessary to the sampling process. Clearly, the general case allows much greater latitude in the selection of sampling parameters. The basic premise of the sampling investigation is that judicious use of this freedom of choice can result in significant improvement over conventional sampling techniques. Assignment of video frames to rows of Table I in an irregular, noncyclic pattern, in general, will require a varying phase shift per frame for each sinusoidal component. Instrumentation of such cases will require switching among phase-shifted sampling component outputs. Switching can be avoided if rows of Table I are assigned to successive frames in order, or in some regular cyclic pattern. In the latter cases, phase shift per frame will be constant for each of the sampling components, and interlace can be obtained simply by precise selection and control of the component frequencies.

Inspection of Table I reveals that any reordering of rows which leaves phase shifts per frame constant is equivalent to a reordering of columns. That is to say, all cases which can be instrumented by frequency selection alone (without switching) may be generated with a fixed assignment of frames to rows of Table I. No loss of generality is involved then, in the discussion of this class of systems, if adjacent rows of Table I are assigned to successive frames.

Sampling component frequencies may be assigned to the columns of Table I in $(N-1)2!=4!$ ways. Sign reversal may be applied to each column independently, multiplying the possible cases by $2^{(N-1)/2}=2^4$ times. Thus there are $(N-1)2!\times2^{(N-1)/2}=4!\times2^4=384$ possible nine-fold interlace cases in the class of systems which may be instrumented by frequency selection alone. Within each case, initial phases are independently variable. A shorthand notation has been used in the enumeration and comparison of the many cases of interest.

TABLE II

| Identification Number | Table I Column Reference | Table I Sign | Phase Shift per Frame, degrees | Revolutions of $\phi$ per Interlace Cycle |
|---|---|---|---|---|
| 1 | 1 | + | 40 | 1 |
| 2 | 2 | + | 80 | 2 |
| 3 | 3 | + | 120 | 3 |
| 4 | 4 | + | 160 | 4 |
| 5 | 4 | − | −160=200 | 5 |
| 6 | 3 | − | −120=240 | 6 |
| 7 | 2 | − | −80=280 | 7 |
| 8 | 1 | − | −40=320 | 8 |

Table II above assigns integers 1 through $(N-1)=8$ to the columns of Table I. The two integers designating the same column with reversed signs are complementary with respect to $N=9$. If successive frames are assigned to adjacent rows of Table I, phase shift per frame (in the positive sense) is equal to $360/N$ degrees times the integer designation of Table II. Thus the integers represent the number of revolutions of the instantaneous phase vector (considered to rotate in a positive sense) during an N-frame cycle of interlace.

Any nine-fold interlace case which may be instrumented by frequency selection alone can be designated by a set of four of these integers, for instance, 3:5:2:8, ordered such that the first integer specifies the Table I column and sign for the lowest-frequency sampling component, and the rest apply to the other components in order of increasing frequency. Two conditions must be imposed.

(1) No integer may appear more than once in the designation of a valid interlace case.

(2) No two integers in the designation of a valid case may add to $N=9$.

The 384 nine-fold interlace cases in the class not requiring switching for instrumentation may be enumerated simply by writing down all the permutations of the $(N-1)=8$ integers, taken in groups of $(N-1)/2=4$, subject to Condition 2 above. (The first condition is automatically satisfied by this statement of the procedure.) Although it is not considered possible to select an optimum case from among the many possibilities without extensive experimentation in viewing tests, procedures are here given for making estimates of the relative merits of the many cases in order to guide this effort and minimize the labor involved. The objective of such procedure is to select cases which will result in the lowest visibility of the undesired video components and a minimum tendency to crawl.

Other factors being equal, the visibility of a given component will increase as its amplitude increases or its frequency decreases. Components to the left of FIGURE 8 are derived from and carry the amplitudes of low-frequency components of the parent video. The amplitudes of monochrome television video components are largest at the low-frequency end and taper off toward the higher frequencies. Thus undesired components in the left-hand columns of FIGURE 8 will tend to be more visible than those to the right, because their amplitudes will, in general, be higher.

Controlled experiments indicate that the amplitude threshold for detectability of a sinusoidal interference component in the presence of a still picture on a television monitor increases approximately as the square of the frequency above about 0.5 mc. At constant amplitude, visibility decreases as frequency is raised. Thus components in the lower rows of FIGURE 8 will tend to be more visible than those in the upper part of the matrix because they occur in the reconstructed video at lower frequencies.

The combined effect of the dependence of visibility on amplitude and frequency of the reconstructed components is to accentuate the relative importance of components represented by the lower left-hand region of the FIGURE 8 matrix. This conclusion suggests an investigation of the detailed manner in which components represented by individual elements of the matrix interlace.

In the class of cases which may be instrumented by frequency selection alone, each of the $\phi_{nk}$ in FIGURE 8 will exhibit a constant phase shift per frame as $k$ varies 1 through N. It follows that each of the sums, differences, and double-angle terms will also undergo phase shifts which are constant from frame to frame. For this class of cases, the $\phi_{nk}$ in FIGURE 8 may be replaced by $\Delta\phi_n$ (phase shift per frame of the $n^{th}$ sampling component), and the latter may be represented by the integers designating the phasing assignments to the respective sampling components.

The construction of Table II is such that the algebraic operations indicated in FIGURE 8, carried out on the integers, will result in the correct designation of the phase shift per frame for the combination terms. In performing these operations, $N=9$ may be added or subtracted as required to bring the resulting numbers into the range of positive integers in Table II. For example, the case 3:5:2:8 is represented in the scheme of FIGURE 8 by the following matrices, where Matrix A indicates the direct substitution of the column and sign designating integers into FIGURE 8, and Matrix B results after carrying out the indicated algebraic operations. Reconstructed video components represented by each of the matrix elements will undergo the phase shift per frame which corresponds to the integer representation, as given in Table II.

MATRIX A

[Nine-Fold Interlace Case 3:5:2:8]

| | | | | | | | | |
|---|---|---|---|---|---|---|---|---|
| 8 | 8+3 | 8−3 | 8+5 | 8−5 | 8+2 | 8−2 | 2×8 | 0 |
| 8 | 8−3 | 8+3 | 8−5 | 8+5 | 8−2 | 8+2 | 0 | 2×8 |
| 2 | 2+3 | 2−3 | 2+5 | 2−5 | 2×2 | 0 | 2+8 | 2−8 |
| 2 | 2−3 | 2+3 | 2−5 | 2+5 | 0 | 2×2 | 2−8 | 2+8 |
| 5 | 5+3 | 5−3 | 2×5 | 0 | 5+2 | 5−2 | 5+8 | 5−8 |
| 5 | 5−3 | 5+3 | 0 | 2×5 | 5−2 | 5+2 | 5−8 | 5+8 |
| 3 | 2×3 | 0 | 3+5 | 3−5 | 3+2 | 3−2 | 3+8 | 3−8 |
| 3 | 0 | 2×3 | 3−5 | 3+5 | 3−2 | 3+2 | 3−8 | 3+8 |
| 0 | 3 | −3 | 5 | −5 | 2 | −2 | 8 | −8 |

MATRIX B

| | | | | | | | | |
|---|---|---|---|---|---|---|---|---|
| 8 | 2 | 5 | 4 | 3 | 1 | 6 | 7 | 0 |
| 8 | 5 | 2 | 3 | 4 | 6 | 1 | 0 | 7 |
| 2 | 5 | 8 | 7 | 6 | 4 | 0 | 1 | 3 |
| 2 | 8 | 5 | 6 | 7 | 0 | 4 | 3 | 1 |
| 5 | 8 | 2 | 1 | 0 | 7 | 3 | 4 | 6 |
| 5 | 2 | 8 | 0 | 1 | 3 | 7 | 6 | 4 |
| 3 | 6 | 0 | 8 | 7 | 5 | 1 | 2 | 4 |
| 3 | 0 | 6 | 7 | 8 | 1 | 5 | 4 | 2 |
| 0 | 3 | 6 | 5 | 4 | 2 | 7 | 8 | 1 |

Performing the indicated operations, adding or subtracting 9 as required, reduces this matrix to:

It will be noted that the assignment of phasing integers 3 or 6 to the lowest-frequency sampling component results in a cluster of 3's and 6's in the lower left-hand corner of the matrix. Reference to Table II shows the phase shift per frame for these terms to be +120 degrees. Thus these components actually interlace on a three-fold basis, and their visibility will be much less dependent on long integration time at the receiver than components requiring the full nine-frame cycle for averaging out. When the order of interlace, N, is factorable, there will always be one or more of the phasing integers which represent interlace cycles involving fewer than N frames, and components represented in the above matrices by these integers should exhibit low visibility. It is desirable, therefore, to assign phasing parameters so that as many of these favorable integers as possible fall in strategic locations in the matrix, i.e., particularly in the lower left-hand region.

There is reason to believe that in nine-fold interlace the phasing integers 4 and 5, representing ±160 degrees of phase shift per frame also constitute favorable assignments. In this case, the full nine frames of the interlace cycle are required for complete averaging to zero, but components so designated almost reverse phase in successive frames, thus almost interlacing on a two-fold basis. Since the general expression for these integers is $(N\pm1)/2$, the phase shifts per frame are given by $180(N\pm1)/N$, and precise phase reversal per frame is approached as N becomes large.

Each sampling case may be represented by a matrix of integers similar to the one shown. Certain patterns of number groupings repeat, providing a means for classifying cases. There will, in general, be a number of equivalent cases with respect to a given selection criterion. For example, all cases $3{:}4{:}x{:}y$, $3{:}5{:}x{:}y$, $6{:}4{:}x{:}y$, $6{:}5{:}x{:}y$ will exhibit similar characteristics with respect to visibility of components in the lower left-hand quarter of the matrix.

Phasing integers specify only a small part of the information required to determine the tendency of a given interlace pattern to crawl. Line-to-line and field-to-field phase differences must be considered, and these depend on the precise frequencies used. No short-cut techniques have been developed to reduce the labor of this sort of investigation. The speed and direction of crawl may be determined for each sampling component by plotting the crests or troughs for successive fields and frames in the manner common to discussions of "dot-sequential" color systems. Crawl characteristics of underised components of the reconstructed video can be identified with those of the raw sampling components via the phasing integers.

Cross-hatch patterns tending to move in some preferred direction across the television monitor will characterize each of the sampling components and undesired components of the reconstructed video. Adequate integration at the receiver will, of course, remove these patterns before viewing. In order to reduce the burden on the integration technique as much as possible, however, it is desirable to select sampling frequencies and phasing parameters which tend to minimize the visibility of these patterns. If the eye is coerced into following the apparent motion of these patterns, their visibility is sharply increased; hence, the aim of crawl studies is the selection of parameters which will randomize the various apparent motions as much as possible and prevent the eye from "locking onto" any single pattern or direction of motion.

If sampling components are exact harmonics, sampling wave shape is constant and crawl effects of the individual harmonics re-enforce each other. Constant wave shapes (e.g., rectangular pulse patterns) therefore maximize the tendency to crawl. In these cases the initial phases determine the sampling waveform, and choices which minimize the peak amplitude of the sampling wave, result in minimum visibility of structure in the reconstructed picture. Instrumentation of these cases is particularly simple. Within the less restrictive conditions of synthetic-pulse sampling, it is possible to select frequencies so related that the cross-hatch patterns due to the several components exhibit differences in slope and crawl direction such that the eye may follow any one of several patterns but is not strongly coerced in any single direction. The two-fold line interlace utilized in commercial television practice relies on this principle. The eye can follow either an upward or downward crawl, but neither predominates and the tendency to crawl is generally ignored. Cancellation, in a mathematical sense, does not occur in either the two-fold or N-fold case, but the several tendencies to crawl in different directions can neutralize each other, at least in part.

Practical applications of the synthetic-pulse technique may be subject to additional boundary conditions. A priori bases for assignment of phasing parameters probably cannot be made completely decisive. Any scheme of usable simplicity may overlook factors having subtle but significant effects on picture quality. Reliable selection of optimum or near-optimum cases can probably be made only on the basis of viewing comparisons.

*Sampling instrumentation*

Figure 9:
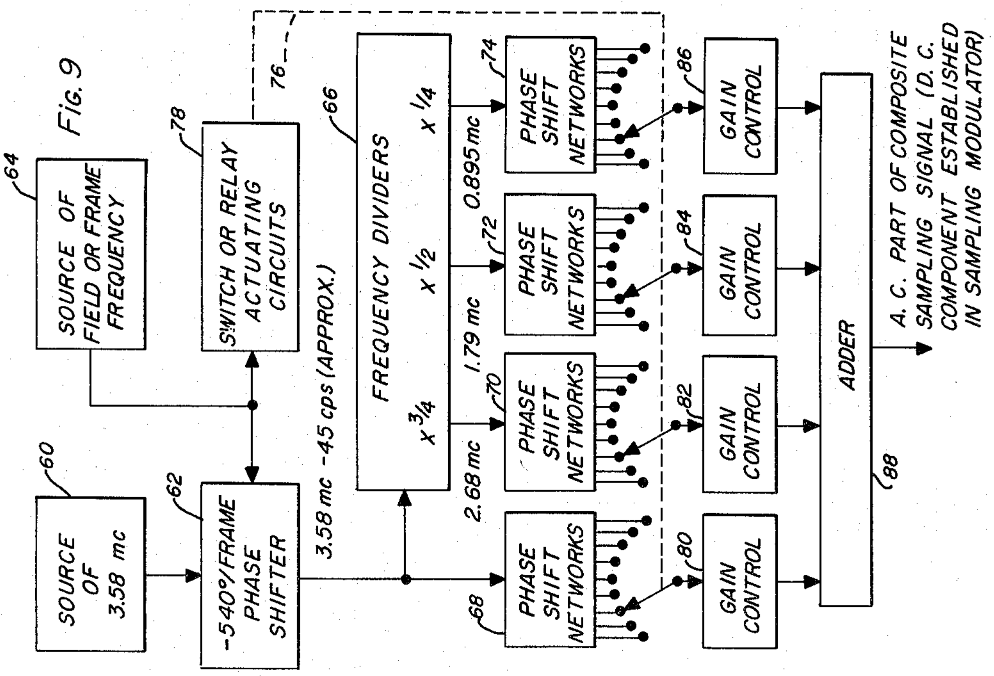
FIGURE 9 is a block diagram of an arrangement for obtaining a ninefold interlace signal in accordance with this invention.

FIGURE 9 is a block diagram of an arrangement for obtaining a nine-fold interlace sampling signal in accordance with this invention. The arrangement shown in FIGURE 9 uses the National Television Standards Committee color subcarrier as the upper sampling component and also as the reference for system synchronization. This frequency was selected because it was a readily available signal locked to synchronizing signals. It should not be construed as a limitation upon the invention. The output of a 3.58 mc. source of oscillations, 60, is applied to a −540° per frame phase shifter 62. This phase shifter may be a mechanically driven rotating capacitor phase shifter, an equivalent all-electronic phase or frequency shifter, or any other means for subtracting one and one-half cycles per frame from the color sub-carrier frequency. Here the phase shifter 62 is driven at a field or frame frequency, whichever is desired, from a source of field-or-frame-frequency signals 64. The output of this phase shifter 62 is applied to the frequency divider circuits 66, which divide the frequency into 2.68 mc., 1.79 mc., and 0.895 mc. The purpose of the phase shifter is to remove the interlace inherent in the color subcarrier frequency and provide a reference signal which executed an integral number of cycles per frame. It is further required that this integral number of cycles per frame contain the factor four, in order that the lower-frequency outputs of the frequency dividers 66 also execute integral numbers of cycles per frame.

Four phase-shift networks 68, 70, 72, and 74 are provided, to which are respectively applied the 3.58 mc. and the three different outputs of the frequency divider 66. These phase-shift networks each provide, as output, the frequency which is applied to their input at nine different phases which are in accordance with one column, or sequence, in Table I. These phase-shift networks may each be a tapped delay line, or a delay network. For the purposes of illustration, the selection from each phase-shift network is made by gang switches 76, driven from a switch, or relay-actuating circuit 78, which in turn is driven from the source of field or frame frequency 64. The outputs selected from the various phase-shift networks are applied to the respective gain controls 80, 82, 84, 86, whereby their amplitudes are adjusted to present an acceptable picture. The outputs of the respective channels are all summed up in an adder 88. The output of the adder circuit is the desired sampling signal. The output of the adder circuit comprises or exemplifies irregularly shaped sampling signals, hereinafter referred to in the claims.

It should be appreciated that the sampling-signal-generator apparatus must be duplicated at both the receiver and the transmitter. Any phasing combinations may be instrumented with this system, which thus provides a high degree of flexibility in the choice of interlace parameters and permits maximum exploitation of the technique of this invention toward reduction of visibility of sampling effects of the reconstructed picture.

Figure 10:
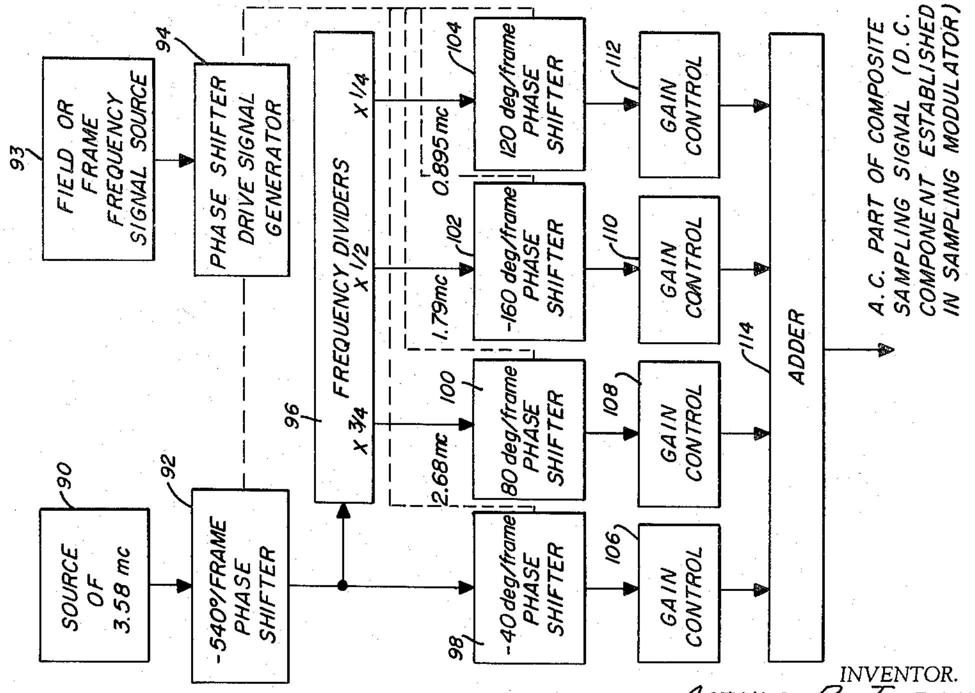
FIGURE 10 is a block diagram of another arrangement for obtaining a ninefold interlace in accordance with this invention.

FIGURE 10 is a block diagram of an arrangement for generating sampling signals for an embodiment of this invention using sampling components which are not precisely harmonically related. This includes a source of 3.58 mc. signals, the output of which is applied to a phase shifter 92 which shifts the phase of the signals −540 degrees per frame. The phase shifter 92, as well as others shown in this figure, are all driven from a phase-shifter drive-signal generator 94. The phase-shifter drive-signal generator is synchronized with signals from a source of signals 93 occurring at either a field or frame rate. The output of the −540 degree per frame phase shifter is applied to frequency dividers 96 and to a −40 degrees per frame phase shifter 98. The frequency dividers 96 multiply the frequency of the input, which is being shifted continuously −540 degrees per frame, by ¾, ½, and ¼. The outputs will then have a frequency of 2.68 mc., 1.79 mc., and 0.895 mc., respectively.

The frequency-divider outputs are respectively applied to three phase shifters 100, 102, 104. The first phase shifter 100 is operated to produce 80 degrees per frame phase shift; the second phase shifter 102 is operated to produce −160 degrees per frame phase shift; and the third phase shifter is operated to produce 120 degrees per frame phase shift. The fact that all phase shifters are driven from the phase-shifter drive-signal generator 94 is represented by the dotted lines connected thereto from the respective phase shifters. It is to be noted that the indicated phasing assignments correspond to the interlace case 3:5:2:8 discussed above and are included only to make the example concrete. The system shown is capable of instrumenting any of the sampling cases in the class achieved by frequency selection alone. The output from each of the phase shifters 98, 100, 102, 104 is respectively applied to an associated gain control 106, 108, 110, 112, which is employed to set the level of the particular output. All the gain-control outputs are thereafter added in an adding circuit 114. The output of the adder comprises the sampling wave shapes which may be used at a transmitter and at a receiver.

The continuous phase shifts per frame indicated for each individual sampling component produce slight shifts in frequency from the exact harmonics produced by the frequency divider. The sampling wave shapes generated vary continuously over a cycle of interlace, repeating only after nine frames. The direction which a given component's sampling structure appears to crawl in the reconstructed picture is keyed to the sign of the frequency shift. Alternation of these signs with increasing or decreasing frequency results in opposing motions to the various crawl components, so that the tendency of the eye to follow a given direction of crawl is reduced.

Figure 11:
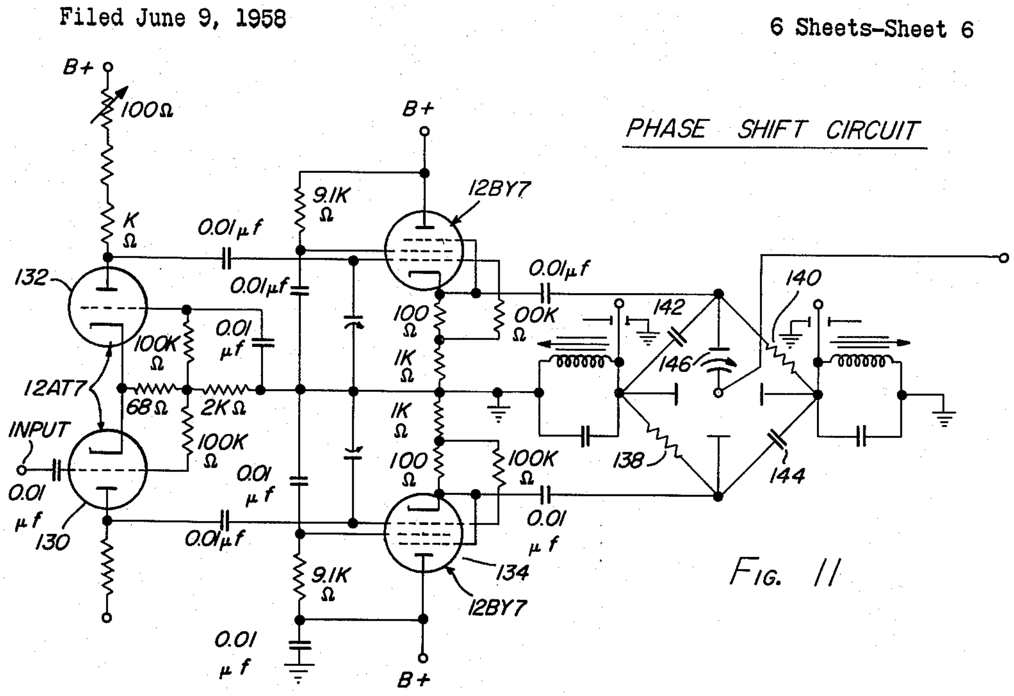
FIGURE 11 is a circuit diagram of a phase shifter which may be employed in the embodiment of the invention.

FIGURE 11 is a circuit diagram illustrative of one of the required four-phase shift networks shown in FIGURE 10. The signal to be phase shifted is applied to a first input tube 130, which is a cathode coupled to a second tube 132. Accordingly, the outputs of these two tubes are 180° out of phase. The outputs from the tubes 130, 132 are respectively applied to tubes 134, 136, which, after suitable amplification, applies these two 180° out-of-phase outputs to the opposite ends of a bridge network consisting of four impedances of equal magnitude, two of which 138, 140 are resistors and the other two of which 142, 144 are capacitors. The four terminals of the bridge network are connected to four plates of a phase-shifting capacitor 146. This phase-shift capacitor has these four stationary plates and one rotating plate.

Considering the phases of the inputs to the bridge network, at one terminal as 0° and at the opposite terminal as 180°, the two remaining terminals will respectively be 90° and 270° out of phase with relation to the 0° terminal. Therefore, as the rotating plate of the phase-shift capacitor 146 is rotated, it picks off a signal at the input frequency, but whose phase varies from 0° to 360°.

Figure 12:
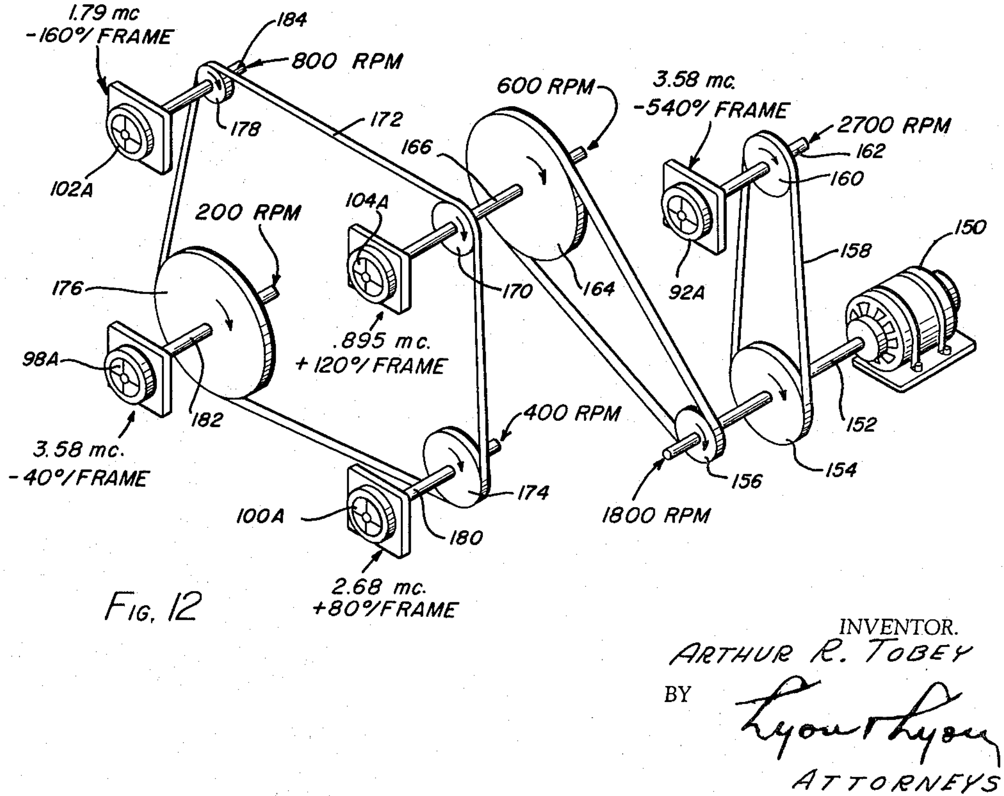
FIGURE 12 is an isometric view showing an arrangement for phase shifting multiple signals.

FIGURE 12 is an isometric view showing a means of coupling all the phase shifters to be driven from a single power source in order to provide the various synchronized phase shifts per frame of all the frequencies employed for the composite pulse sampling, as described in connection with FIGURE 10. There are five phase shifters. In order to associate the mechanical phase shifters shown with the block diagram in FIGURE 10, the same number reference numerals are assigned to the mechanical phase shifters, but the letter "A" will be associated therewith. Thus, phase shifter 92A, consisting of a rotating capacitor and plate and four fixed capacitor plates in the manner diagrammatically shown in FIGURE 9, is required to provide to the 3.58 mc. signal a phase shift of −540° per frame. It is therefore geared to be driven at a rotation of 2700 r.p.m.

The phase shifter 100A for 2.685 mc., which is to provide +80° phase shift per frame, is coupled to be driven at a 400 r.p.m. speed; the phase shifter 98A, which is required to provide −40° per frame phase shift for 3.58 mc., is coupled to be driven at a 200 r.p.m. speed; the phase shifter 102A, which is required to shift the frequency 1.79 mc. −160° per frame, is driven at 800 r.p.m. speed; and the phase shifter 104A, which is required to shift 0.895 mc.+120° per frame is coupled to be driven at a speed of 600 r.p.m. Whether the phase shift is positive or negative can be established by switching the terminals to which the 0° and 180° phase inputs are applied to the bridge shown in FIGURE 12.

All the phase-shift capacitors are driven from a single synchronous motor 150, which is a 60-cycle 1800 r.p.m. synchronous motor. It has a drive shaft 152, on which are mounted a first pulley 154 having 30 teeth and a second pulley 156 having 16 teeth. The 30-tooth pulley 154 is coupled by a belt 158, also having teeth, to a pulley 160, which has 20 teeth. The pulley 160 is driven and, in turn, rotates the phase-shift capacitor 92A by means of a shaft 162. The 16-tooth pulley 156 is coupled by another belt 162, which drives a 48-tooth pulley 164. This pulley is mounted on a shaft 166. This shaft drives the phase-shift capacitor 104A. Also mounted on the shaft is a second pulley 170, which has 16 teeth and drives a third belt 172. This third belt drives three other pulleys 174, which has 24 teeth, 176, which has 48 teeth, and 178, which has 12 teeth. The 24-tooth pulley 174 is coupled by a shaft 180 to drive the phase-shift capacitor 100A. The 48-tooth pulley is coupled by a shaft 182 to drive the phase-shift capacitor 98A. The 12-tooth pulley 178 is coupled by a shaft 184 to drive the phase-shift capacitor 102A. The pulley diameters and teeth are selected to provide the speeds indicated for the various shafts, whereby the required phase shifts per frame are obtained.

As previously indicated, the gain controls are merely variable amplifiers. The adder may consist of any analog summing network wherein the inputs to separate resistors are summed across a common summing resistor. The output of the summing network consists of the irregular wave shape sampling signals which, in the transmitter, are modulated by the video signals, and, in the receiver, are modulated upon the received signals in order to provide again the required wide-band video.

There has accordingly been described and shown herein a novel and useful signal transmission system which may be employed in communication systems wherein the signals transmitted have a large amount of redundancy. The system applies a high-order interlace technique to a reduced redundancy video signal. The high-order interlace is performed by using sampling waveforms which are not constant or regular. A suitable sampling waveform generator is shown and required at both transmitter and receiver. This combination permits the employment of integration in the receiver for removing sampling effects from the viewed picture, at the same time preserving the adequate portrayal of motion.

Although a specific embodiment of the invention has been shown and described, many other modifications thereof will be apparent to those skilled in the art to which it pertains. This invention, therefore, is not to be limited, except by the prior art and by the spirit of the appended claims.

I claim:

1. A communication system for signals having television signal characteristics comprising a differencing means to which said signals are applied, a sampling wave shape generator, sampling means, means for applying output from said differencing means and from said sampling wave shape generator to said sampling means to provide sampled difference signals, a low-pass filter to which said sampled difference signals are applied, a resampling wave shape generator, resampling means, means for applying output from said resampling wave shape generator and from said low-pass filter to said resampling means, and integrating means to which output from said resampling means is applied to provide as output said signals having television characteristics.

2. A communication system for signals having television signal characteristics comprising means for modifying said signals into the linear combination of a difference component and an unmodified component, a first means for generating irregularly shaped sampling wave shapes, sampling means to which output from said means for modifying and said means for generating are applied, a low-pass filter to which output from said sampling means is applied, resampling means, means for applying output from said low-pass filter to said resampling means, a second means for generating irregularly shaped sampling wave shapes which have substantially identical frequency and phase characteristics as said first means, means for applying output from said second means for generating to said resampling means, and integrating means to which output from said resampling means is applied to provide as output said signals having television characteristics.

3. A communication system as recited in claim 2 wherein said means for modifying said signals into the linear combination of a difference component and an unmodified component comprises a first means for multiplying said signals by a factor A+1, where A is any desired gain value, a second means for multiplying said signals by a factor −A, delay means for delaying the output of said second means by a desired delay interval, and means for adding the output of said first means to the output of said delay means.

4. A communication system as recited in claim 3 wherein each said first and second means for generating irregularly shaped sampling wave shapes includes a source of principal frequency signals, means for continuously shifting the phase of said principal frequency signal, means for deriving a plurality of related signals from said phase-shifted principal frequency signals, means for continuously shifting the phase of said phase-shifted principal frequency signals, and said plurality of related signals predetermined amounts over said desired delay intervals, and an adding circuit for adding all said phase-shifted signals.

5. A communication system as recited in claim 3 wherein said integrating means includes an adding circuit having two inputs and an output, output from said resampling means being applied to one of said adder inputs, and means coupling said adder output to the other of its inputs including means for delaying said adder output for said desired delay interval, and an amplifier for said means for delaying output having a gain factor less than one.

6. A communication system as recited in claim 2 wherein said means for modifying said signals into the linear combination of a difference component and an unmodified component includes a first amplifier having a gain of $A+1=(1-t)(1-r)^{-1}$, where $A$ equals any desired gain factor,
where $t$ equals a desired weighting ratio which is less than 1,
where $r$ equals a desired attenuation factor which is less than 1 and greater than $t$.

a first and a second adder circuit each having two inputs and an output, means for applying said signals to said first amplifier and first adder inputs, means for delaying said first adder output for a desired interval, an attenuator having a gain equal to $t$, said attenuator coupling said means for delaying to said first adder second input, a second amplifier having a gain equal to $-(1-t)A$, said second amplifier having its input coupled to said means for delaying and its output coupled to one of said second adder inputs, means coupling said first amplifier output to the other of said second adder inputs, and an output terminal coupled to said second adder output.

7. A bandwidth reduction system for signals having television signal characteristics comprising differencing means for modifying said signals into a linear combination of a difference component and an unmodified component, said difference component being the difference between the current value of said signals and their value at an earlier instant, means for generating irregular-shaped sampling signals including means for generating signals at a principal frequency, means for shifting the phase of said principal frequency a predetermined amount over the interval of the taking of a difference component, means for deriving a plurality of related signals from said phase-shifted principal frequency signals, means for shifting the phases of said phase-shifted principal frequency signals and said related signals predetermined amounts over the interval of the taking of a difference component, and means for adding all said phase-shifted signals, sampling means to which the output of said differencing means and said means for adding is applied, and a low-pass filter to which the output of said sampling means is applied.

8. A system for reducing the bandwidth of transmission of signals having television characteristics comprising means for obtaining the difference between current values of said signals and values of said signals at a predetermined previous time to obtain difference signals, means for adding said difference signals to current values of said signals to obtain modified signals, means for generating sampling wave shapes, means for sampling said modified signals with said sampling wave shapes, means for generating resampling wave shapes, means for resampling the output of said means for sampling with said resampling wave shapes, and means for integrating the output of said means for resampling for reconstructing said signals.

9. A system for reducing the bandwidth of transmission of signals having television characteristics as recited in claim 8 wherein said means for generating sampling wave shapes and for generating resampling wave shapes each includes means for generating a plurality of sinusoidal wave shape components, means for separately phase shifting said sinusoidal wave shape components for developing an interlace, and means for adding all said separately phase shifted sinusoidal wave shape components to produce an irregularly shaped signal.

10. A system for reducing the bandwidth of transmission of signals having television characteristics as recited in claim 8 wherein said means for generating sampling wave shapes and for generating resampling wave shapes each includes means for generating a plurality of sinusoidal wave shape components, means for separately phase shifting said sinusoidal wave shape components from frame to frame for developing an interlace, and means for adding all said separately phase shifted sinusoidal wave shape components to obtain an irregularly shaped signal which differs from frame to frame.

11. A system for reconstructing signals having television signal characteristics which have been sampled by irregular-shaped sampling signals and then passed through a low-pass filter comprising means for generating irregular-shaped sampling signals having the same phase and frequencies as said sampling signals, resampling means to which said signals to be reconstructed and the output of said means for generating is applied, and integrating apparatus to which the output of said resampling means is applied.

12. In a bandwidth reduction system for signals having television signal characteristics, means for modifying said signals into a linear combination of a difference component and an unmodified component including two signal transfer paths to which said signals are applied, an adder circuit for linearly combining outputs from both said paths, one of said paths including an amplifier having a gain of $1+A$ where A is any desired gain factor, the second of said paths including means for delaying signals a desired interval of time, and means for amplifying the output of said means for delaying signals by a factor A.

13. In a bandwidth reduction system for signals having television signal characteristics, means for modifying said signals into a linear combination of a difference component and an unmodified component including a first amplifier having a gain of $A+1=(1-t)(1-r)^{-1}$, where $A$ equals any desired gain factor,
where $t$ equals a desired weighting ratio which is less than 1,
where $r$ equals a desired attenuation factor which is less than 1 and greater than $t$, a first and a second adder circuit each having two inputs and an output, means for applying said signals to said first amplifier and first adder inputs, means for delaying said first adder output for a desired interval, an attenuator having a gain equal to $t$, said attenuator coupling said means for delaying to said first adder second input, a second amplifier having a gain equal to $-(1-t)A$, said second amplifier having its input coupled to said means for delaying and its output coupled to one of said second adder inputs, means coupling said first amplifier output to the other of said second adder inputs, and an output terminal coupled to said second adder output.

14. A bandwidth reduction system for signals having television signal characteristics, and being generated for recurrent display at a desired frame rate, said system including first means for generating irregular wave shape sampling signals, means to which said signals and said sampling signals are applied for sampling said signals, a low-pass filter to which the output of said means for sampling is applied, a resampling means to which output from said low-pass filter is applied, second means for generating irregular wave shape resampling signals substantially identical to those of said first means, means to apply the output of said second means for generating to said means for resampling, and means for integrating the output of said means for resampling.

15. A bandwidth reduction system as recited in claim 11 wherein said integrating means includes an adding circuit having two inputs and an output, output from said resampling means being applied to one of said inputs, and means coupling said adder output to the other of its inputs including means for delaying said adder output for a desired interval, and an amplifier coupled to said means for delaying and having a gain factor less than one.

16. In a system for electronically sampling signals, an improved sampling wave shape generator including means for generating a plurality of sinusoidal wave shape components, means for separately phase shifting said sinusoidal wave shape components for developing an interlace, and means for adding all said separately phase shifted sinusoidal wave shape components to produce an irregularly shaped sampling signal.

17. In a system for electronically sampling signals which are generated in a frame to frame sequence, an improved sampling wave shape generator including means for generating a plurality of sinusoidal wave shape components, means for separately phase shifting said sinusoidal wave shape components from frame to frame for developing an interlace, and means for adding all said separately phase shifted sinusoidal wave shape components to obtain an irregularly shaped sampling signal which differs from frame to frame.

18. A system for reducing by a factor N the required transmission bandwidth of video signals having a bandwidth W, said signals being generated for recurrent display at a desired frame rate, said system comprising means for generating a plurality of different frequency sampling signals, the number of said sampling signals when N is odd being $(N-1)/2$ and a direct current component, and each separate frequency component $f_n$ being determined approximately by $2nW/N$ where $n$ represents whole numbers from 1 through $N-1/2$, the number of said sampling signals when N is even being $N/2$ and a direct current component, each frequency component being determined approximately by $2nW/N$ where $n$ represents whole numbers from 1 through $N/2$, means for continuously shifting the phase of each frequency component over each frame an amount to obtain (1) a zero value sum when the instantaneous phase vectors for a frequency component taken at corresponding instants in N successive frames are added, (2) a zero value sum when the vectors taken at corresponding instants in N successive frames formed by adding the instantaneous phases of any two frequency components are added, (3) a zero value sum when the vectors taken at corresponding instants in N successive frames formed by taking the difference between the instantaneous phases of any two sampling components are added, and (4) a zero value sum when with the exception of the highest frequency component in even-order interlace the vectors taken at corresponding instants in N successive frames formed by doubling the instantaneous phase of any sampling component are added, means to add all the continuously shifted frequency components and said direct current component, a sampling circuit, means to apply said video signals and the output of said means to add to said sampling circuit, a filter having a bandpass of $W/N$ cycles per second, and means to apply the output of said sampling circuit to said filter.

19. A system for reducing by a factor N the required transmission bandwidth of video signals having a bandwidth W, said signals being generated for recurrent display at a desired frame rate, said system comprising means for generating a principal frequency signal having a value $(N-1)W/N$ cycles per second where N is odd and a value W where N is even, first means for shifting the phase of said principal frequency signal a predetermined amount for each frame, means for deriving from the output of said first means for shifting a plurality of different frequency signals, the frequency of each different frequency signal being determined by $2nW/N$ where $n$ represents whole numbers from 1 up to but exclusive of N–½ where N is odd and represents whole numbers from 1 up to but exclusive of $N/2$ where N is even, a separate phase shifter for shifting the phase of each of said different frequency signals and the output of said first phase shifter a different predetermined amount for each frame, means for adding all said separate phase shifter outputs together, a sampling circuit, means for applying the output of said means for adding and said video signals to said sampling circuit, a filter having a bandwidth of $W/N$ cycles per second, and means for applying the output of said sampling circuit to said filter.

20. A system for reducing by a factor N the required transmission bandwidth of video signals as recited in claim 21 wherein there is included a source of frame signals, and means to operate said first means for shifting the phase of said principal frequency signal and each said separate phase shifters in synchronism responsive to said source of frame signals to provide for each of said signals phase shifts to obtain (1) a zero value sum when the instantaneous phase vectors for a frequency component taken at corresponding instants in N successive frames are added, (2) a zero value sum when the vectors taken at corresponding instants in N successive frames formed by adding the instantaneous phases of any two frequency components are added, (3) a zero value sum when the vectors taken at corresponding instants in N successive frames formed by taking the difference between the instantaneous phases of any two sampling components are added, and (4) a zero value sum when with the exception of the highest frequency component in even-order interlace the vectors taken at corresponding instants in N successive frames formed by doubling the instantaneous phase of any sampling component are added.

21. A system for recovering video signals of bandwidth W from signals having a bandwidth $W/N$ which were generated by sampling the original signals with irregular wave shape sampling signals and then passing them through a filter having a bandwidth $W/N$, said system comprising means for generating irregular wave shape resampling signals substantially identical with those used for sampling said original video signals, and resampling apparatus to which said signals of bandwidth $W/N$ and said resampling signals are applied to provide as output the original video signals.

22. A system as recited in claim 23 wherein said means for generating irregular wave shape sampling signals includes means for generating a plurality of different frequency sampling signals, the number of said sampling signals when N is odd being $(N-1)/2$ and a direct current component, and each separate frequency component $f_n$ being determined approximately by $2nW/N$ where $n$ represents whole numbers from 1 through $N-1/2$, the number of said sampling signals when N is even being $N/2$ and a direct current component, each frequency component being determined approximately by $2nW/N$ where $n$ represents whole numbers from 1 through $N/2$, means for continuously shifting the phase of each frequency component over each frame an amount to obtain (1) a zero value sum when the instantaneous phase vectors for a frequency component taken at corresponding instants in N successive frames are added, (2) a zero value sum when the vectors taken at corresponding instants in N successive frames formed by adding the instantaneous phases of any two frequency components are added, (3) a zero value sum when the vectors taken at corresponding instants in N successive frames formed by taking the difference between the instantaneous phases of any two sampling components are added, and (4) a zero value sum when with the exception of the highest frequency component in even-order interlace the vectors taken at corresponding instants in N successive frames formed by doubling the instantaneous phase of any sampling component are added, and means to add all the continuously shifted frequency components and said direct current component.

References Cited in the file of this patent

UNITED STATES PATENTS

| | | |
|---|---|---|
| 2,321,611 | Moynihan | June 15, 1943 |
| 2,784,256 | Cherry | Mar. 5, 1957 |
| 2,810,780 | Loughlin | Oct. 22, 1957 |